United States Patent
Yang et al.

(10) Patent No.: US 11,367,272 B2
(45) Date of Patent: Jun. 21, 2022

(54) TARGET DETECTION METHOD, APPARATUS, AND SYSTEM

(71) Applicant: HUAWEI TECHNOLOGIES CO., LTD., Shenzhen (CN)

(72) Inventors: Yi Yang, Beijing (CN); Yuhao Jiang, Beijing (CN); Maolin Chen, Beijing (CN); Shuang Yang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 87 days.

(21) Appl. No.: 16/854,815

(22) Filed: Apr. 21, 2020

(65) Prior Publication Data

US 2020/0250461 A1    Aug. 6, 2020

Related U.S. Application Data

(63) Continuation of application No. PCT/CN2019/072015, filed on Jan. 16, 2019.

(30) Foreign Application Priority Data

Jan. 30, 2018 (CN) .......................... 201810094901.X

(51) Int. Cl.
*G06V 10/50* (2022.01)
*G06T 7/11* (2017.01)
(Continued)

(52) U.S. Cl.
CPC ............. *G06V 10/50* (2022.01); *G06K 9/629* (2013.01); *G06K 9/6262* (2013.01);
(Continued)

(58) Field of Classification Search
CPC .... G06T 7/11; G06K 9/00362; G06K 9/6262; G06K 9/6279; G06K 9/629; G06K 9/4642

See application file for complete search history.

(56) References Cited

U.S. PATENT DOCUMENTS 10,223,614 B1 * 3/2019 Kim .......................... G06K 9/66
10,229,346 B1 * 3/2019 Kim ..................... G06N 3/0454
(Continued)

FOREIGN PATENT DOCUMENTS

CN    103390150 A    11/2013
CN    103853794 A    6/2014
(Continued)

OTHER PUBLICATIONS

Fan Zhang et al: "SAR Target Recognition Using the Multi-aspectaware Bidirectional LSTM Recurrent Neural Networks", ARXIV.ORG, Cornell University Library, 201 Olin Library Cornell University Ithaca, NY 14853, Jul. 25, 2017, XP081279115, total 11 pages.

(Continued)

*Primary Examiner* — Mia M Thomas
(74) *Attorney, Agent, or Firm* — Stein IP, LLC

(57) ABSTRACT

A target detection method and apparatus, in which the method includes: obtaining a target candidate region in a to-be-detected image; determining at least two part candidate regions from the target candidate region by using an image segmentation network, where each part candidate region corresponds to one part of a to-be-detected target; and extracting, from the to-be-detected image, local image features corresponding to the part candidate regions; and learning the local image features of the part candidate regions by using a bidirectional long short-term memory LSTM network, to obtain a part relationship feature used to describe a relationship between the part candidate regions; and detecting the to-be-detected target in the to-be-detected image based on the part relationship feature. As a result, image data processing precision in target detection can be improved, application scenarios of target detection can be diversified, and target detection accuracy can be improved.

14 Claims, 12 Drawing Sheets

(51) Int. Cl.
*G06K 9/62* (2022.01)
*G06V 40/10* (2022.01)

(52) U.S. Cl.
CPC .............. *G06K 9/6279* (2013.01); *G06T 7/11* (2017.01); *G06V 40/10* (2022.01); *G06T 2207/20021* (2013.01); *G06T 2207/20081* (2013.01); *G06T 2207/30196* (2013.01)

(56) References Cited

U.S. PATENT DOCUMENTS

| | | | |
|---|---|---|---|
| 10,509,987 B1* | 12/2019 | Kim | G06K 9/6232 |
| 10,699,168 B1* | 6/2020 | Xu | G06Q 10/00 |
| 10,726,303 B1* | 7/2020 | Kim | G05D 1/0088 |
| 11,042,742 B1* | 6/2021 | Yang | G06T 7/11 |
| 2012/0128255 A1* | 5/2012 | Aoyama | G06V 40/10 382/195 |
| 2013/0301911 A1 | 11/2013 | Rong et al. | |
| 2017/0193312 A1* | 7/2017 | Ai | G06V 30/194 |
| 2017/0337687 A1* | 11/2017 | Wang | G06K 9/627 |
| 2018/0046910 A1* | 2/2018 | Greene | G06N 3/02 |
| 2018/0260414 A1* | 9/2018 | Gordo Soldevila | G06N 3/0445 |
| 2018/0267558 A1* | 9/2018 | Tiwari | H04N 13/254 |
| 2019/0096066 A1* | 3/2019 | Chen | G06T 7/11 |
| 2019/0138607 A1* | 5/2019 | Zhang | G06K 9/00355 |
| 2019/0143517 A1* | 5/2019 | Yang | G06N 3/0454 700/245 |
| 2019/0205606 A1* | 7/2019 | Zhou | G06N 3/0454 |
| 2019/0205607 A1* | 7/2019 | Hong | G06K 9/6274 |
| 2019/0258878 A1* | 8/2019 | Koivisto | G05D 1/00 |
| 2020/0257979 A1* | 8/2020 | Luo | G06N 3/084 |
| 2020/0410669 A1* | 12/2020 | Psota | G06T 7/0012 |
| 2021/0158525 A1* | 5/2021 | Iwase | G06T 7/97 |
| 2021/0192730 A1* | 6/2021 | Raciti | G06K 9/4671 |
| 2021/0201504 A1* | 7/2021 | Xu | G05D 1/0221 |
| 2021/0217182 A1* | 7/2021 | Li | G10L 21/028 |
| 2021/0270959 A1* | 9/2021 | Jiang | G01S 13/933 |
| 2021/0279640 A1* | 9/2021 | Tu | G05D 1/0088 |

FOREIGN PATENT DOCUMENTS

| | | |
|---|---|---|
| CN | 104166861 A | 11/2014 |
| CN | 104537647 A | 4/2015 |
| CN | 105095835 A | 11/2015 |
| CN | 105095869 A | 11/2015 |
| CN | 105678297 A | 6/2016 |
| CN | 106203506 A | 12/2016 |
| CN | 106650667 A | 5/2017 |
| CN | 106803083 A | 6/2017 |
| CN | 106845374 A | 6/2017 |
| CN | 106971154 A | 7/2017 |
| CN | 107145845 A | 9/2017 |

OTHER PUBLICATIONS

Pedro F. Felzenszwalb et al. Object Detection with Discriminatively Trained Part-Based Models, IEEE Transactions On Pattern Analysis and Machine Intelligence, vol. 32, No. 9, Sep. 2010, pp. 1627-1645.

Jun Zhu et al. DEEPM: A Deep Part-Based Model for Object Detection and Semantic Part Localization, ICLR 2016, total 18 pages.

Yonglong Tian et al. Deep Learning Strong Parts for Pedestrian Detection, 2015 IEEE International Conference on Computer Vision (ICCV), pp. 1904-1912.

Shaoqing Ren et al. Faster R-CNN: Towards Real-Time Object Detection with Region Proposal Networks, IEEE Transactions On Pattern Analysis and Machine Intelligence, vol. 39, No. 6, Jun. 2017, pp. 1137-1149.

Piotr Dollar et al. Fast Feature Pyramids for Object Detection, Submission To IEEE Transactions On Pattern Analysis and Machine Intelligence, 2014, total 14 pages.

Long J, Shelhamer E, Darrell T. Fully convolutional networks for semantic segmentation, Proceedings of the IEEE Conference on Computer Vision and Pattern Recognition. 2015: 3431-3440.

Ren S, He K, Girshick R, et al. Fast R-Cnn. IEEE International Conference on Computer Vision, 2015:1440-1448.

* cited by examiner

TARGET DETECTION METHOD, APPARATUS, AND SYSTEM

CROSS-REFERENCE TO RELATED APPLICATIONS

This application is a continuation of International Application No. PCT/CN2019/072015, filed on Jan. 16, 2019, which claims priority to Chinese Patent Application No. 201810094901.X, filed on Jan. 30, 2018, the disclosures of the aforementioned applications are hereby incorporated by reference in their entireties.

TECHNICAL FIELD

Embodiments of this application relate to the field of big data, and in particular, to a target detection method and apparatus.

BACKGROUND

In the historical background of safe city establishment, search-by-image becomes one of important technical means to assist a public security organization (for example, the people's public security) to quickly locate a crime location and a movement track of a target (for example, a criminal suspect). Search-by-image is finding image data including a target from a massive amount of surveillance video data by using a query image including the target, and determining, based on the image data including the target, information such as a time and a location at which the target appears in a surveillance video, so as to determine a movement track of the target. Search-by-image includes two processes: target database establishment and target query. In the target database establishment process, target detection and tracking first need to be performed on a massive number of videos, and each piece of image data of the target is extracted from massive video data, to create a target database used for search-by-image. In the target query process, an input query image including a target is compared with the image data included in the target database, to locate information such as a time and a location at which the target appears in the massive videos.

In a target detection manner in the prior art, a target candidate region is extracted from an image, then the target candidate region is divided into rectangular image blocks of a fixed size, and further, rectangular image blocks of different quantities at different locations are combined to obtain a possible part region of a target. For example, assuming that the target is a pedestrian, possible part regions of the target that are obtained through rectangular image block division and recombination include a head, a shoulder, a left body, a right body, a leg, and the like. In the prior art, the target candidate region is divided based on a rectangular image block. As a result, division precision is low, a relatively large amount of interference information is included in each rectangular image block obtained through division, and accuracy of reflecting a posture change or a blocking status of the target is low. Consequently, the target detection manner has poor applicability.

SUMMARY

Embodiments of this application provide a target detection method and apparatus, to improve image data processing precision in target detection, diversify application scenarios of target detection, and improve target detection accuracy, so that target detection method and apparatus have higher applicability.

According to a first aspect, an embodiment of this application provides a target detection method, and the method includes the following. A target candidate region in a to-be-detected image and a global image feature corresponding to the target candidate region are obtained. Herein, the target candidate region may include a plurality of regions of a target (the target herein may be understood as a to-be-detected target in actual detection), and the plurality of regions include a region that actually includes the target, and also include a region that may include the target but actually does not include the target. The global image feature herein is an image feature corresponding to the target candidate region. The global image feature is an image feature extracted by using the target as a whole, and the image feature may also be referred to as an overall image feature. Part candidate regions respectively corresponding to at least two parts are determined from the target candidate region by using an image segmentation network, and local image features corresponding to the part candidate regions are extracted from the to-be-detected image. The local image feature herein is an image feature extracted for a local detail such as a part of the target, and one part candidate region corresponds to one group of local image features. The local image features corresponding to the part candidate regions are learned by using a bidirectional long short-term memory LSTM network, to obtain a part relationship feature used to describe a relationship between the part candidate regions. The to-be-detected target in the to-be-detected image is detected based on the part relationship feature.

In some implementations, the relationship between the part candidate regions includes at least one of a relationship between the detected target and the part candidate regions, or a dependency relationship between the part candidate regions. The relationship between the detected target and the part candidate regions includes: a relationship that is between a same detected target to which the part candidate regions belong and the part candidate regions and that exists when the part candidate regions belong to the same detected target, and/or a relationship that is between each of the part candidate regions and a detected target to which the part candidate region belongs and that exists when the part candidate regions belong to different detected targets.

In this embodiment of this application, prediction results that are of pixels and that correspond to parts may be divided by using the image segmentation network, to obtain a part candidate region corresponding to each part. Pixels whose prediction results belong to a same part may be grouped into a part candidate region corresponding to the part. When parts of the target are identified and divided by using the image segmentation network, and a pixel-level image feature may be identified, so that part division has higher division accuracy, thereby varying scenarios, such as target posture change scenarios, to which the target detection method is applicable. Therefore, the target detection method has higher applicability. In this embodiment of this application, after obtaining the local image features of higher division accuracy are obtained by using the image segmentation network, the relationship between the part candidate regions is learned by using the bidirectional LSTM, so that not only an obvious location relationship between the part candidate regions can be learned, but also an implied part relationship between the part candidate regions can be analyzed, and the implied part relationship includes the following. The parts belong to a same detected pedestrian, the parts belong to different detected pedestrians, or the like. Therefore, part identifiability is increased when a posture of the to-be-detected target in the to-be-detected image is changed or the to-be-detected target in the to-be-detected image is blocked, thereby improving target detection accuracy. In this embodiment of this application, the part relationship feature obtained by learning the local images feature corresponding to the part candidate regions may be used to determine whether the to-be-detected image includes the target. This is simple to operate, and target identification efficiency is high.

In some implementations, when detecting the to-be-detected target in the to-be-detected image based on the part relationship feature, the to-be-detected target in the to-be-detected image may be determined based on the part relationship feature with reference to the global image feature. In this embodiment of this application, the part relationship feature may be further merged with the global image feature to detect the to-be-detected target in the to-be-detected image, so as to avoid interference caused by a part division error, and improve target detection accuracy.

In some implementations, the part relationship feature may be merged with the global image feature, and a first confidence level of each of a category and a location of the to-be-detected target in the to-be-detected image is obtained through learning based on a merged feature. A second confidence level at which the target candidate region includes the to-be-detected target is determined based on the global image feature, and it is determined, based on merging of the first confidence level and the second confidence level, that the to-be-detected image includes the to-be-detected target. Further, a location of the to-be-detected target in the to-be-detected image may be determined based on a location, in the to-be-detected image, of the target candidate region including the to-be-detected target. In this embodiment of this application, the first confidence level is used to determine, at a part layer of a target, whether the to-be-detected image includes the target and a prediction result of a target location. The second confidence level is used to determine, at a layer of an entire target, whether the to-be-detected image includes the target and a prediction result of a target location. When the second confidence level is greater than or equal to a preset threshold, it may be determined that the target candidate region is a region including the target; or when the second confidence level is less than a preset threshold, it may be determined that the target candidate region is a background region that does not include the target. In this embodiment of this application, the first confidence level is merged with the second confidence level, so that a more accurate prediction result may be obtained based on a prediction result corresponding to the first confidence level and with reference to a prediction result corresponding to the second confidence level, thereby improving prediction precision of target detection. In this embodiment of this application, the global image feature, of the target candidate region, in the to-be-detected image may be merged with the part relationship feature between the part candidate regions, and the global image feature is merged with the local image feature to obtain a more rich feature expression, so that a more accurate detection result may be obtained, thereby improving target detection accuracy. Therefore, the target detection method has higher applicability.

In some implementations, when the local image features of the part candidate regions are learned by using the bidirectional LSTM, the local image features of the part candidate regions may be sorted in a preset part sequence to obtain a sorted feature sequence, and the feature sequence is input to the bidirectional LSTM. The relationship between the part candidate regions is learned by using the bidirectional LSTM and by using a binary classification problem distinguishing between a target and a background as a learning task. Herein, the binary classification problem distinguishing between a target and a background may be understood as a classification problem used to determine whether a part candidate region is a region including a target or a region that does not include a target (that is, a background is included), where the two cases are counted as two classes: a target and a background. For ease of description, the classification problem may be briefly referred to as the binary classification problem distinguishing between a target and a background. The preset part sequence may be a preset part arrangement sequence, for example, a head, a left arm, a right arm, a left hand, a right hand, an upper body, a left leg, a right leg, a left foot, and a right foot. The preset part sequence may be specifically determined according to a requirement in an actual application scenario, and is not limited herein. In this embodiment of this application, when the relationship between the part candidate regions is learned by using the bidirectional LSTM, a learning objective is set for the bidirectional LSTM network, that is, a binary classification problem used to determine whether a part candidate region is a target or a background is used as the learning objective, to obtain, through learning, the part relationship feature used to indicate the relationship between the part candidate regions. Further, the to-be-detected target may be detected by using the part relationship feature that is obtained by using the bidirectional LSTM through learning and that is used to describe the relationship between the part candidate regions. This is simple to operate, and target detection efficiency may be improved.

According to a second aspect, an embodiment of this application provides a target detection method, and the method includes the following. A target candidate region in a to-be-detected image and a global image feature corresponding to the target candidate region are obtained. A positive sample image feature and a negative sample image feature that are used for part identification are obtained, and a part identification model is constructed based on the positive sample image feature and the negative sample image feature. It may be understood that the part identification model herein is a network model that has a capability of obtaining a local image feature of a target part, and a specific existence form of the part identification model is not limited herein. Part candidate regions respectively corresponding to at least two parts are determined from the target candidate region by using the part identification model, and local image features corresponding to the part candidate regions are extracted from the to-be-detected image. The local image features of the part candidate regions are learned by using a bidirectional long short-term memory LSTM network, to obtain a part relationship feature used to describe a relationship between the part candidate regions. A to-be-detected target in the to-be-detected image is detected based on the part relationship feature.

In this embodiment of this application, the part identification model that has a part identification capability may be constructed by using the positive sample image feature and the negative sample image feature that are used for part identification, and a local image feature corresponding to each part may be extracted from the to-be-detected image by using the part identification model, so as to diversify manners of identifying a target part, diversify manners of obtaining a part candidate region and a local image feature, and diversify manners of implementing target detection. Therefore, the target detection method has higher applicability.

In some implementations, when the positive sample image feature and the negative sample image feature that are used for part identification are obtained, a candidate box template in which a target is used as a detected object may be first obtained. The candidate box template is divided into N grids, and a grid covered by a region in which each part of the target is located is determined from the N grids, where N is an integer greater than 1. Then, a positive sample image and a negative sample image used for target detection may be obtained by using the candidate box template from sample images used for target part identification. It may be understood that the candidate box template may be a pre-constructed template used for part identification function training, and the template is applicable to part identification function training of the part identification model used for target detection. Further, a sample image used for part identification may be obtained, and a plurality of candidate regions in which a target is used as a detected object are determined from the sample image. Then, a candidate region labeled with the target in the plurality of candidate regions is determined as a positive sample region of the target, and a candidate region whose intersection-over-union with the positive sample region is less than a preset proportion is determined as a negative sample region of the target. Herein, intersection-over-union of two regions may be understood as a ratio of an area of an intersection of the two regions to an area of union of the two regions. The positive sample region is divided into N grids, a positive sample grid and a negative sample grid that correspond to each part are determined from the N grids of the positive sample region based on the candidate box template. The negative sample region is divided into N grids, and a grid that is in the N grids of the negative sample region and that corresponds to each part is determined as a negative sample grid of the part. Further, an image feature of a positive sample grid region of each part is determined as a positive sample image feature of the part, and an image feature of a negative sample grid region of each part is determined as a negative sample image feature of the part.

In this embodiment of this application, a positive sample image feature and a negative sample image feature that correspond to each part of a target may be determined by using massive sample images. A part identification model with higher part identification precision may be obtained by training a large quantity of positive sample image features and negative sample image features of each part. Therefore, when a local image feature of each part is extracted from the to-be-detected image by using the part identification model, extraction precision of an image feature corresponding to the part can be improved, accuracy of part segmentation of the target is improved, and manners of extracting the local image feature of each part is also diversified.

In some implementations, when the positive sample grid and the negative sample grid corresponding to each part are determined from the N grids of the positive sample region based on the candidate box template, a part grid covered by each part may be determined from the N grids of the positive sample region based on a grid that is in the candidate box template and that is covered by a region in which the part is located. When a part grid covered by any part i includes a part grid j, and a degree at which a region covered by the part i in the part grid j overlaps a region of the part grid j is greater than or equal to a preset threshold, the part grid j is determined as a positive sample grid of the part i. By analogy, a positive sample grid of each part may be determined, where both i and j are natural numbers. Alternatively, when a part grid covered by any part i includes a part grid j, and a degree at which a region covered by the part i in the part grid j overlaps a region of the part grid j is less than a preset threshold, the part grid j is determined as a negative sample grid of the part i. By analogy, a negative sample grid of each part may be determined. Herein, the degree at which the region covered by the part i overlaps the region of the part grid j may be a ratio of an area of a visible region that is of the part i and that is included in the part grid j to an area of the part grid j. The visible region of the part i is a region that is in a positive sample region in the to-be-detected image and that is covered by the part i, and the region covered by the part i may include one or more of the N grids, that is, any part may cover one or more grids in the positive sample region.

In this embodiment of this application, a grid covered by each part may be selected from a positive sample image in the to-be-detected image by using the candidate box template, and then an image feature corresponding to the grid may be used as a positive sample image feature used to train the part identification model. In this way, precision of selecting a positive sample image feature is higher, so that interference data in sample data used to train the part identification model may be reduced, thereby improving part identification accuracy of the part identification model obtained through training, and improving target detection accuracy in the to-be-detected image.

In some implementations, when the part identification model is constructed by using the positive sample image feature and the negative sample image feature in the sample image, the positive sample image feature of each part in the sample image and the negative sample image feature of each part may be used as input of the part identification model. A capability of obtaining a local image feature of the part is obtained by using the part identification model and by using a binary classification problem distinguishing between a target part and a background as a learning task. Therefore, this is simple to operate, and the target detection method has higher applicability.

In some implementations, when the to-be-detected target in the to-be-detected image is determined based on the part relationship feature, the part relationship feature may be merged with a global image feature, and a first confidence level of each of a category and a location of the to-be-detected target in the to-be-detected image is obtained through learning based on a merged feature. A second confidence level at which the target candidate region includes the to-be-detected target is determined based on the global image feature, and it is determined, based on merging of the first confidence level and the second confidence level, that the to-be-detected image includes the to-be-detected target. Further, a location of the to-be-detected target in the to-be-detected image may be determined based on a location, in the to-be-detected image, of the target candidate region including the to-be-detected target. Herein, when the location of the to-be-detected target in the to-be-detected image is determined, a location, in the to-be-detected image, of a target candidate region that actually includes the to-be-detected target may be determined as the location of the to-be-detected target. This is easy to operate and is highly feasible.

In some implementations, when the local image features of the part candidate regions are learned by using the bidirectional LSTM, the local image features of the part candidate regions may be sorted in a preset part sequence to obtain a sorted feature sequence, and the feature sequence is input to the bidirectional LSTM. Then the relationship between the part candidate regions may be learned by using the bidirectional LSTM and by using a binary classification problem distinguishing between a target and a background as a learning task. In this embodiment of this application, the relationship between the part candidate regions includes at least one of a relationship between the detected target and the part candidate regions, or a dependency relationship between the part candidate regions. The relationship between the detected target and the part candidate regions includes: a relationship that is between a same detected target to which the part candidate regions belong and the part candidate regions and that exists when the part candidate regions belong to the same detected target, and/or a relationship that is between each of the part candidate regions and a detected target to which the part candidate region belongs and that exists when the part candidate regions belong to different detected targets.

According to a third aspect, an embodiment of this application provides a target detection apparatus, and the apparatus includes units and/or modules that are configured to perform the target detection method provided in any one of the first aspect and/or the possible implementations of the first aspect. Therefore, beneficial effects (or advantages) of the target detection method provided in the first aspect can also be implemented.

According to a fourth aspect, an embodiment of this application provides a target detection apparatus, and the apparatus includes units and/or modules that are configured to perform the target detection method provided in any one of the second aspect and/or the possible implementations of the second aspect. Therefore, beneficial effects (or advantages) of the target detection method provided in the second aspect can also be implemented.

According to a fifth aspect, an embodiment of this application provides a terminal device, and the terminal device includes a memory and a processor. The memory is configured to store a group of program code. The processor is configured to invoke the program code stored in the memory, to perform the target detection method provided in any one of the first aspect and/or the possible implementations of the first aspect. Therefore, beneficial effects of the target detection method provided in the first aspect can also be implemented.

According to a sixth aspect, an embodiment of this application provides a computer device, and the computer device may be a terminal device or another type of computer device. The computer device includes a memory and a processor, and may further include an input/output device, a communications interface, and the like. The memory is configured to store a group of program code. The processor is configured to invoke the program code stored in the memory, to perform the target detection method provided in any one of the second aspect and/or the possible implementations of the second aspect. Therefore, beneficial effects of the target detection method provided in the second aspect can also be implemented.

According to a seventh aspect, an embodiment of this application provides a computer readable storage medium, and the computer readable storage medium stores an instruction. When the instruction is run on a computer, the computer performs the target detection method provided in any one of the first aspect and/or the possible implementations of the first aspect, and beneficial effects of the target detection method provided in the first aspect can also be implemented.

According to an eighth aspect, an embodiment of this application provides a computer readable storage medium, and the computer readable storage medium stores an instruction. When the instruction is run on a computer, the computer performs the target detection method provided in any one of the second aspect and/or the possible implementations of the second aspect, and beneficial effects of the target detection method provided in the second aspect can also be implemented.

According to a ninth aspect, an embodiment of this application provides a target detection apparatus. The target detection apparatus may be a chip or a plurality of chips working in cooperation. The target detection apparatus includes an input device coupled to the target detection apparatus, and the target detection apparatus is configured to perform the technical solution provided in the first aspect of the embodiments of this application.

According to a tenth aspect, an embodiment of this application provides a target detection apparatus. The target detection apparatus may be a chip or a plurality of chips working in cooperation. The target detection apparatus includes an input device coupled to the target detection apparatus, and the target detection apparatus is configured to perform the technical solution provided in the second aspect of the embodiments of this application.

According to an eleventh aspect, an embodiment of this application provides a target detection system. The target detection system includes a processor, configured to support a target detection apparatus in implementing a function in the first aspect, for example, generating or processing information in the target detection method provided in the first aspect. In a possible design, the target detection system further includes a memory, and the memory is configured to store a program instruction and data that are necessary for the target detection apparatus. The target detection system may include a chip, or may include a chip and another discrete part.

According to a twelfth aspect, an embodiment of this application provides a target detection system. The target detection system includes a processor, configured to support a target detection apparatus in implementing a function in the second aspect, for example, generating or processing information in the target detection method provided in the second aspect. In a possible design, the target detection system further includes a memory, and the memory is configured to store a program instruction and data that are necessary for the target detection apparatus. The target detection system may include a chip, or may include a chip and another discrete part.

According to a thirteenth aspect, an embodiment of this application provides a computer program product including an instruction, and when the computer program product is run a computer, the computer performs the target detection method provided the first aspect, and beneficial effects of the target detection method provided in the first aspect can also be implemented.

According to a fourteenth aspect, an embodiment of this application provides a computer program product including an instruction, and when the computer program product is run a computer, the computer performs the target detection method provided the second aspect, and beneficial effects of the target detection method provided in the second aspect can also be implemented.

In the embodiments of this application, image data processing precision in target detection can be improved, application scenarios of target detection can be diversified, and target detection accuracy can be improved. Therefore, the target detection method and apparatus have higher applicability.

DESCRIPTION OF EMBODIMENTS

Figure 1:
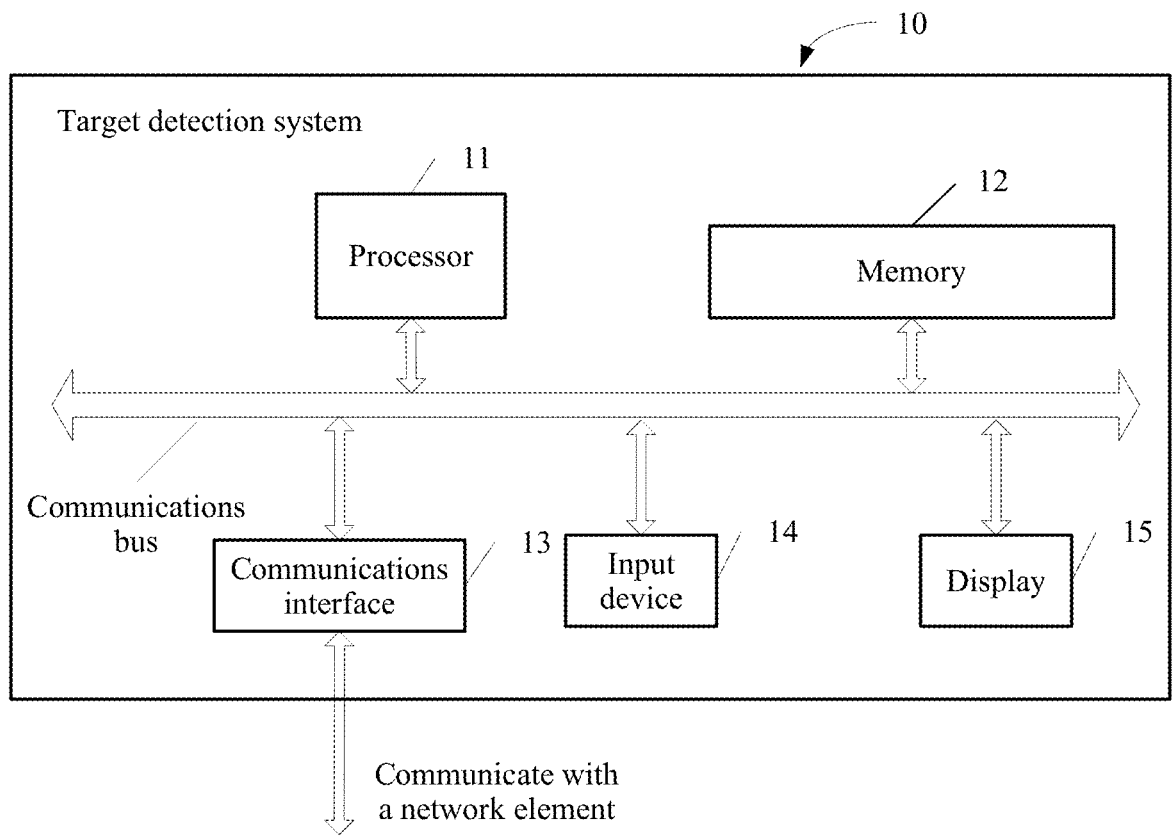
FIG. 1 is a schematic diagram of a system architecture to which a target detection method according to an embodiment of this application is applicable.

A target detection method and apparatus provided in the embodiments of this application are applicable to detected targets that include but are not limited to a pedestrian, an animal, a vehicle, an article carried around by people, and the like. This is not limited herein. Detection of the targets such as the pedestrian or the animal further includes detection of different postures of the pedestrian or the animal, or detection performed when a part of a body of the pedestrian or the animal is blocked. This is not limited herein. The article carried around by the pedestrian may include a portable controlled tool and the like concerned about in a safe city. This is not limited herein. For ease of description, in a subsequent description of the embodiments of this application, a to-be-detected target (or referred to as a target) is described by using a pedestrian.

Currently, in the field of pedestrian detection, a deep learning-based pedestrian detection method based on a deep neural network model is one of the main methods for pedestrian detection. In the deep learning-based pedestrian detection method based on the deep neural network model, a feature extraction network model is first constructed, so as to extract features from a pedestrian region and a background region in a detected image by using the feature extraction network model. Then, a pedestrian detection problem is converted into a classification problem (for ease of description, in the following, the classification problem is briefly referred to as a binary classification problem used to determine whether a pedestrian is included or a pedestrian is not included (that is, a background is included), where the two cases are counted as two classes, or is briefly referred to as a binary classification problem distinguishing between a pedestrian and a background) used to determine whether a region includes a pedestrian (a region including a pedestrian is classified as a pedestrian region, and a region including no pedestrian is classified as a background region), and a regression problem used to determine a specific location (used to indicate a specific location of a pedestrian in the detected image), in the detected image, of a region including the pedestrian, so as to design an optimization function. Further, the feature extraction network model may be trained with reference to a large amount of sample image data used for pedestrian detection, to obtain parameters of the following parts in the feature extraction network model: a feature extraction part, a classification part, and a regression (that is, locating) part. When a to-be-detected image is input to the feature extraction network model, the feature extraction part in the feature extraction network model is first used to extract an image feature, and extract a pedestrian candidate region based on the feature. Then the classification part in the feature extraction network model is used to determine whether each pedestrian candidate region includes a pedestrian, and the regression part in the feature extraction network model is used to determine a specific location, in the to-be-detected image, of the pedestrian in each pedestrian candidate region including the pedestrian, so as to complete pedestrian target detection in the to-be-detected image.

The embodiments of this application provide a pedestrian detection method and apparatus (namely, a target detection method and apparatus, where a target detection method and apparatus in which a pedestrian is used as a target is used as an example) in which an overall image feature of a pedestrian is merged with a local image feature of a pedestrian part. In the pedestrian detection method and apparatus provided in the embodiments of this application, a deep learning framework is used to detect a pedestrian, and a local image feature of a pedestrian part is obtained based on the deep learning framework by using an image segmentation network, so that pedestrian part division is more accurate and a quantity of pedestrian parts may be flexibly adjusted according to an actual situation, extraction precision of a local image feature of a pedestrian part is higher, and operations are more flexible. In addition, in the pedestrian detection method provided in the embodiments of this application, a long short-term memory (LSTM) network is used to learn a relationship between pedestrian parts, to obtain a feature (for ease of description, a part relationship feature may be used below for description) used to describe the relationship between the pedestrian parts. Finally, multi-task learning is used to mine a correlation between an overall image feature of a pedestrian and a local image feature of a pedestrian part, to efficiently share a feature, so that a pedestrian detection rate can be improved in a complex pedestrian detection scenario, especially in a pedestrian detection scenario in which a pedestrian part is blocked seriously, thereby accurately identifying a pedestrian and a specific location of the pedestrian. Optionally, in the embodiments of this application, pedestrian parts may include a head, a trunk, a left arm, a left hand, a right arm, a right hand, a left leg, a left foot, a right leg, a right foot, and the like. This is not limited herein.

FIG. 1 is a schematic diagram of a system architecture to which a target detection method according to an embodiment of this application is applicable. The target detection method provided in this embodiment of this application is applicable to a target detection system 10, for example, a search-by-image system. The target detection system 10 includes, but is not limited to, processing modules such as a processor 11, a memory 12, a communications interface 13, an input device 14, and a display 15. The modules such as the processor 11, the memory 12, the communications interface 13, the input device 14, and the display 15 may be connected by using a communications bus. This is not limited herein. The communications interface 13 is configured to communicate with a network element, to establish a communication connection between the target detection system 10 and the network element. The input device 14 is configured to input to-be-processed data such as a surveillance video. The memory 12 may be configured to store data such as an operating system, an application program, and a pedestrian detection algorithm. The processor 11 is configured to perform the pedestrian detection algorithm to implement pedestrian detection on the to-be-processed data. The display 15 may be configured to display a pedestrian detection result. The memory 12 is further configured to store the pedestrian detection result for the to-be-processed data.

The memory 12 is further configured to store a program. Specifically, the program may include program code, and the program code includes a computer operation instruction. The memory 12 includes but is not limited to a random access memory (RAM), a read-only memory (ROM), an erasable programmable read only memory (EPROM), or a compact disc read-only memory (CD-ROM). Only one memory is shown in FIG. 1. Certainly, a plurality of memories may be disposed according to a requirement.

The memory 12 may be alternatively a memory in the processor 11. This is not limited herein.

The processor 11 may be one or more central processing units (CPU). When the processor 11 is one CPU, the CPU may be a single-core CPU, or may be a multi-core CPU. The processor 11 may be a general purpose processor, a digital signal processor (DSP), an application-specific integrated circuit (ASIC), a field-programmable gate array (FPGA) or another programmable logic device, a discrete gate or transistor logic device, or a discrete hardware part; and may implement or perform the target detection method provided in the embodiments of this application. The general purpose processor may be a microprocessor, or the processor may be any conventional processor or the like.

The input device 14 may include a surveillance camera, a camera of a wireless terminal, or the like. This is not limited herein. The wireless terminal may be a handheld device with a radio connection function, or another processing device connected to a radio modem, and may be a mobile terminal that communicates with one or more core networks by using a radio access network. For example, the wireless terminal may be a mobile phone, a computer, a tablet computer, a personal digital assistant (PDA), a mobile internet device (MID), a wearable device, or an e-book reader (e-book reader). For another example, the wireless terminal may be a portable, pocket-sized, handheld, computer built-in, or vehicle-mounted mobile device.

The input device 14 is configured to input to-be-detected data, for example, to-be-processed data such as a surveillance video and image (for ease of description, in this embodiment of this application, a to-be-detected image is used as an example for description). After a surveillance video is input to the target detection system 10, the processor 11 may be configured to perform a pedestrian detection method provided in the embodiments of this application, to detect a pedestrian in the surveillance video. After completing detection on the pedestrian in the surveillance video, the processor 11 may display a detection result on the display for a user to view. In addition, after the pedestrian in the surveillance video is detected, data in a database constructed with reference to subsequent algorithms such as pedestrian tracking and pedestrian image feature extraction may be further stored in the memory for subsequent query. An implementation of the pedestrian detection method performed by the processor is described below with reference to FIG. 1. The pedestrian detection method provided in the embodiments of this application is only an example of the target detection method in which a pedestrian is used as a target in the embodiments of this application. Specifically, the target detection method provided in the embodiments of this application may also be used to detect a target such as an animal or a vehicle. This is not limited herein. For ease of description, the pedestrian detection method is used as an example below for description, that is, a target to be detected in the target detection method is described by using a pedestrian as an example.

In some implementations, the pedestrian detection method provided in the embodiments of this application may be performed by a target detection apparatus, for example, the processor 11 in the target detection system 10. This is not limited herein.

Figure 2:
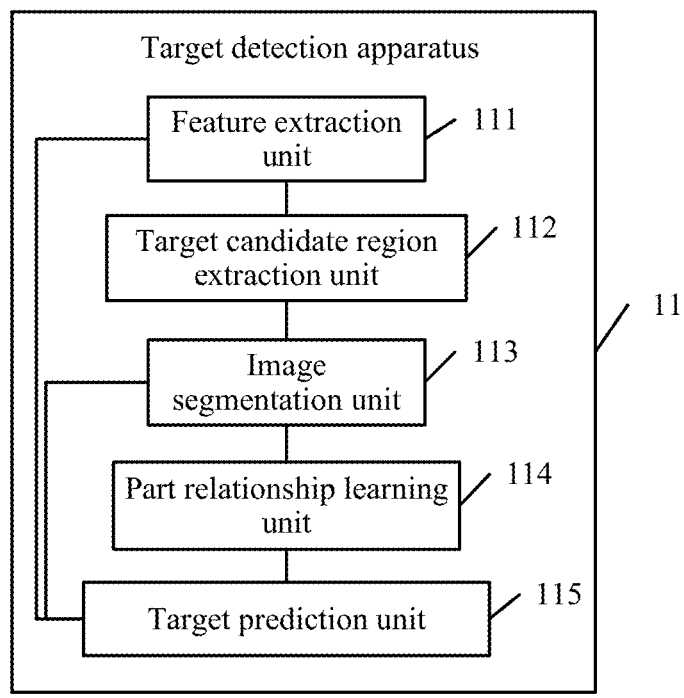
FIG. 2 is a schematic structural diagram of a target detection apparatus according to an embodiment of this application.

FIG. 2 is a schematic structural diagram of a target detection apparatus according to an embodiment of this application. In this embodiment of this application, the target detection apparatus includes but is not limited to a feature extraction unit 111, a target candidate region extraction unit 112, an image segmentation unit 113, a part relationship learning unit 114, and a target prediction unit 115.

The feature extraction unit 111 is configured to obtain an image feature, in a to-be-detected image, for which a pedestrian is used as a detected target.

The target candidate region extraction unit 112 is configured to extract all possible pedestrian candidate regions from the to-be-detected image based on the image feature extracted by the feature extraction unit 111 for the detected target, namely, the pedestrian. In this embodiment of this application, the pedestrian candidate region may be a specifically candidate rectangular box region of the pedestrian. This is not limited herein.

The feature extraction unit 111 is further configured to extract, from the image feature extracted from the to-be-detected image, an overall image feature corresponding to the pedestrian candidate region. The overall image feature corresponding to the pedestrian candidate region may be an image feature extracted by using the pedestrian as a whole in the pedestrian candidate region. This is not limited herein.

The image segmentation unit 113 is configured to extract, by using an image segmentation network from each pedestrian candidate region extracted by the target candidate region extraction unit 112, a local image feature that corresponds to each part and that is segmented for the pedestrian part.

The image segmentation unit 113 is further configured to perform, based on the extracted local image feature corresponding to each part, part segmentation in the pedestrian candidate region extracted by the target candidate region extraction unit 112, to obtain a part candidate region of the pedestrian. There may be one or more part candidate regions obtained by dividing the pedestrian candidate region. A plurality of part candidate regions is used as an example for description in this embodiment of this application.

The part relationship learning unit 114 is configured to learn, by using a bidirectional LSTM, a relationship between part candidate regions obtained by the image segmentation unit 113 through segmentation, to obtain a part relationship feature used to describe the relationship between the part candidate regions. In this embodiment of this application, the bidirectional LSTM is used to learn the relationship between part candidate regions, so that not only an obvious location relationship between the part candidate regions can be learned, but also an implied part relationship between the part candidate regions can be analyzed. For example, in a pedestrian candidate region, there are pedestrian parts such as an arm, a head, and a trunk, but the head belongs to one pedestrian, and the arm and the trunk belong to another pedestrian. To be specific, when different pedestrians block each other, a bidirectional LSTM model may determine, to an extent, whether the pedestrian candidate region includes one pedestrian or a plurality of pedestrians.

Optionally, in this embodiment of this application, the bidirectional LSTM is used to learn the relationship between part candidate regions, so that not only a relationship between the detected target and the part candidate regions can be learned, but also a dependency relationship between the part candidate regions can be learned. The relationship between the detected target and the part candidate regions may include the following. The part candidate regions belong to a same detected pedestrian, or the part candidate regions belong to different detected pedestrians. In this embodiment of this application, when the bidirectional LSTM is used to determine the relationship between the part candidate regions, if the part candidate regions belong to a same detected pedestrian, a relationship between the same detected pedestrian and the part candidate regions may be learned. Optionally, in this embodiment of this application, when the bidirectional LSTM is used to determine the relationship between the part candidate regions, if the part candidate regions belong to different detected pedestrians, a relationship between each of the part candidate regions and a detected pedestrian to which the part candidate region belongs may be further learned. For example, a plurality of part candidate regions separately belong to a head candidate region, a trunk candidate region, a leg candidate region, and the like of a detected pedestrian. Alternatively, a plurality of part candidate regions separately belong to different detected pedestrians, and include a head candidate region of a detected pedestrian 1, a trunk candidate region of a detected pedestrian 2, a leg candidate region of the detected pedestrian 1, and the like. The relationship between part candidate regions is merely an example, and may be specifically determined according to a posture change or a blocking status of a to-be-detected pedestrian in a to-be-detected image in an actual application scenario. This is not limited herein.

The target prediction unit 115 is configured to merge, at a feature layer, the overall image feature extracted by the feature extraction unit 111 with the part relationship feature obtained by the part relationship learning unit 114 through learning, to obtain a merged feature. For example, the overall image feature is merged with the part relationship feature through series connection, and the merged feature is sent to a local classifier, to obtain a score based on the local classifier. The score of the local classifier indicates a probability, determined by the local classifier based on the input feature, that a pedestrian is included. Optionally, the target prediction unit 115 is further configured to: send the overall image feature to an overall classifier used for pedestrian detection, to obtain a score based on the overall classifier; and merge, at a classifier layer, the score of the overall classifier used for the pedestrian detection with the score of the local classifier, to obtain a pedestrian detection result for detection of the pedestrian in the to-be-detected image. In the implementation in which the final pedestrian detection result is obtained by merging the score of the overall classifier for pedestrian detection with the score of the local classifier, interference caused by a part division error can be avoided, thereby improving accuracy of pedestrian detection.

A specific implementation of the pedestrian detection method provided in the embodiments of this application is described below with reference to the target detection apparatus.

Embodiment 1

Figure 3:
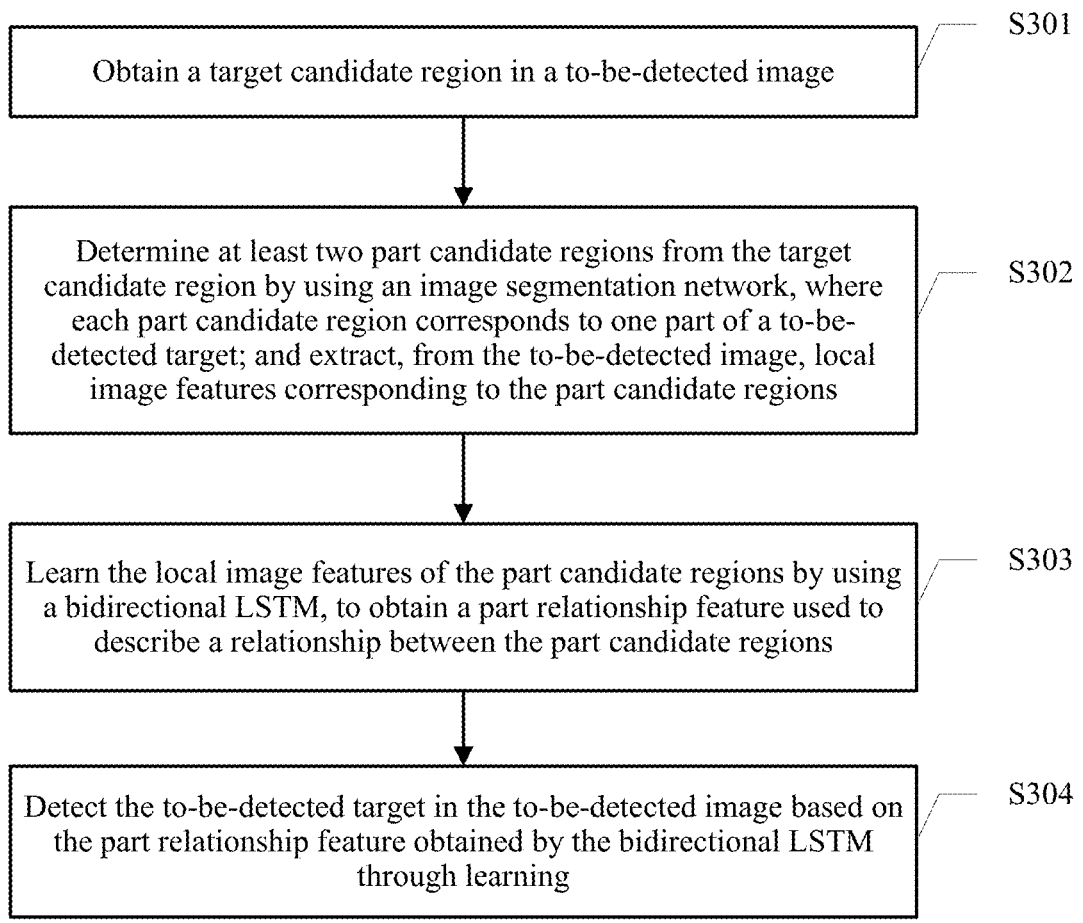
FIG. 3 is a schematic flowchart of a target detection method according to an embodiment of this application.

FIG. 3 is a schematic flowchart of a target detection method according to an embodiment of this application. The target detection method provided in this embodiment of this application may include the following steps.

S301. Obtain a target candidate region in a to-be-detected image.

In some implementations, after the to-be-detected image is input to the target detection system 10 by using the input device 14, the feature extraction unit 111 extracts, from the to-be-detected image, an image feature for which a pedestrian is used as a detected object. In a deep learning-based pedestrian detection method based on a deep neural network model, a deep feature of the to-be-detected image may be first extracted by using a convolutional neural network (CNN), and then a local region candidate box is extracted from the to-be-detected image by using a region proposal network (RPN) based on the deep feature extracted by the convolutional neural network, for example, an external rectangular box of a pedestrian that may include the pedestrian. Optionally, when extracting the image feature from the to-be-detected image, the feature extraction unit 111 may first use an original network model in a deep learning framework as initialization of a target network model used for pedestrian detection. Then the feature extraction unit 111 may replace a classification problem of the original network model with a classification problem used to determine whether a region is a pedestrian region including a pedestrian or a background region that does not include a pedestrian (that is, a binary classification problem used to determine whether a pedestrian is included or a pedestrian is not included (that is, a background is included), where the two cases are counted as two classes, and this is briefly referred to as a binary classification problem distinguishing between a pedestrian and a background); train the original network model with reference to a sample image (or a sample data set) used for pedestrian detection, to construct the target network model used for pedestrian detection. The constructed target network model used for pedestrian detection may be a convolutional neural network, so that the constructed convolutional neural network can be better adapted to a pedestrian detection task. For example, a visual geometry group network (VGG Net) obtained by training an ImageNet data set may be first selected as an original network model used for training, and then a 1000-class classification problem in the original ImageNet data set is replaced with the binary classification problem distinguishing between a pedestrian and a background. The VGG Net is trained with reference to the sample image used for pedestrian detection. An existing network model framework of the VGG Net is used to initialize the VGG Net, and the sample image used for pedestrian detection is used to train, for the existing network model framework, a function of distinguishing between a pedestrian and a background. A network parameter of the VGG Net is adjusted by training the VGG Net, so that the network parameter of the VGG Net is a network parameter applicable to the pedestrian detection. This process may be referred to as a process in which the VGG Net model is finely adjusted to construct a network model used for pedestrian detection.

Optionally, the original network model in the deep learning framework may further include network models such as Alex, GoogleNet, and ResNet. Specifically, the original network model may be determined according to a requirement in an actual application scenario. This is not limited herein.

Optionally, after constructing the convolutional neural network used for pedestrian detection, the feature extraction unit 11 may extract, from the to-be-detected image by using the convolutional neural network, the image feature for which a pedestrian is used as a detected object. Optionally, the image feature may be a deep feature at a last convolution layer of the convolution neural network, and the image feature may be an image feature used to describe whether a to-be-detected model includes a pedestrian, and is an image feature extracted by using the pedestrian as a whole. Therefore, for ease of description, the image feature is also referred to as an overall image feature.

Figure 4:
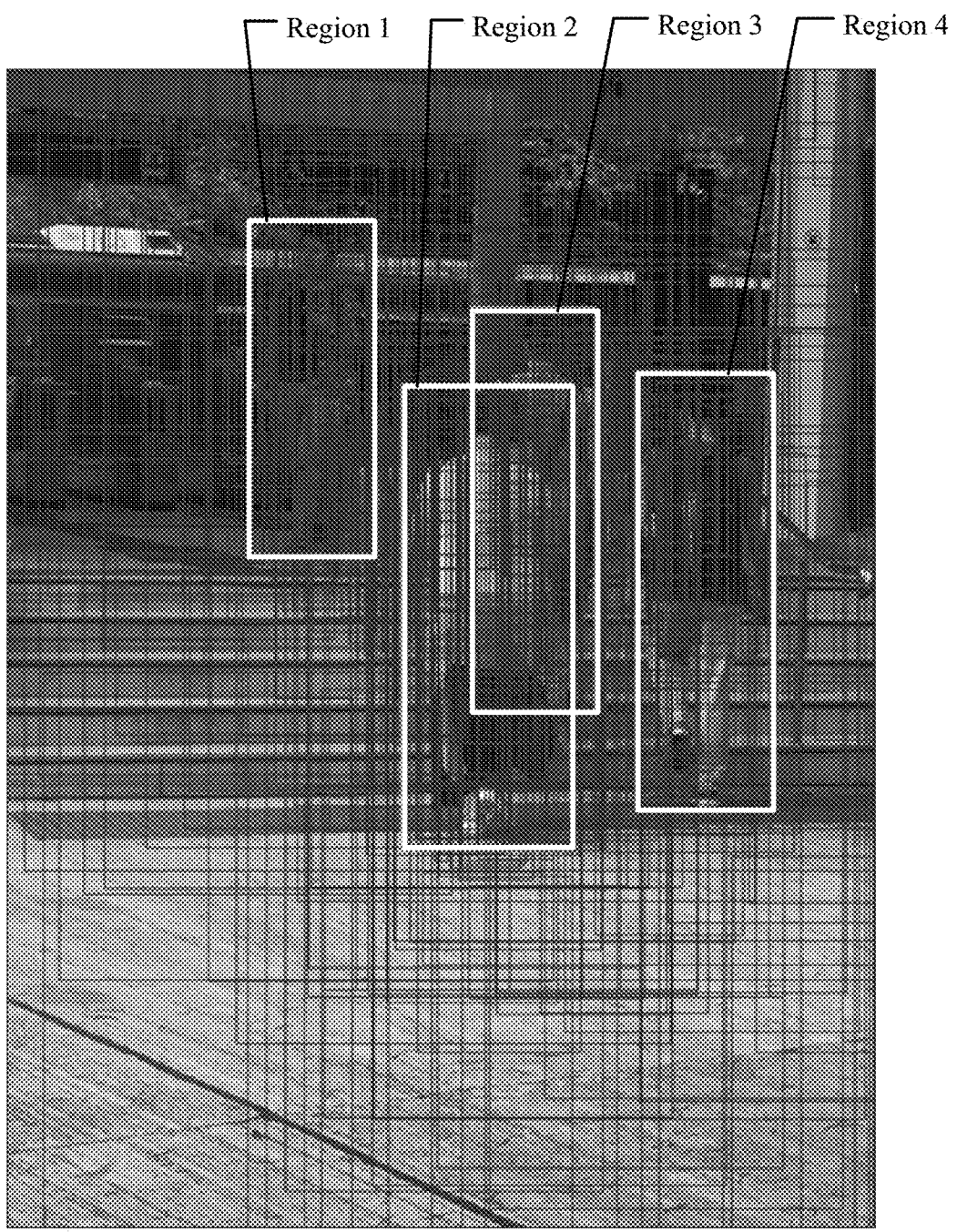
FIG. 4 is a schematic diagram of a pedestrian candidate region according to an embodiment of this application.
Figure 5:
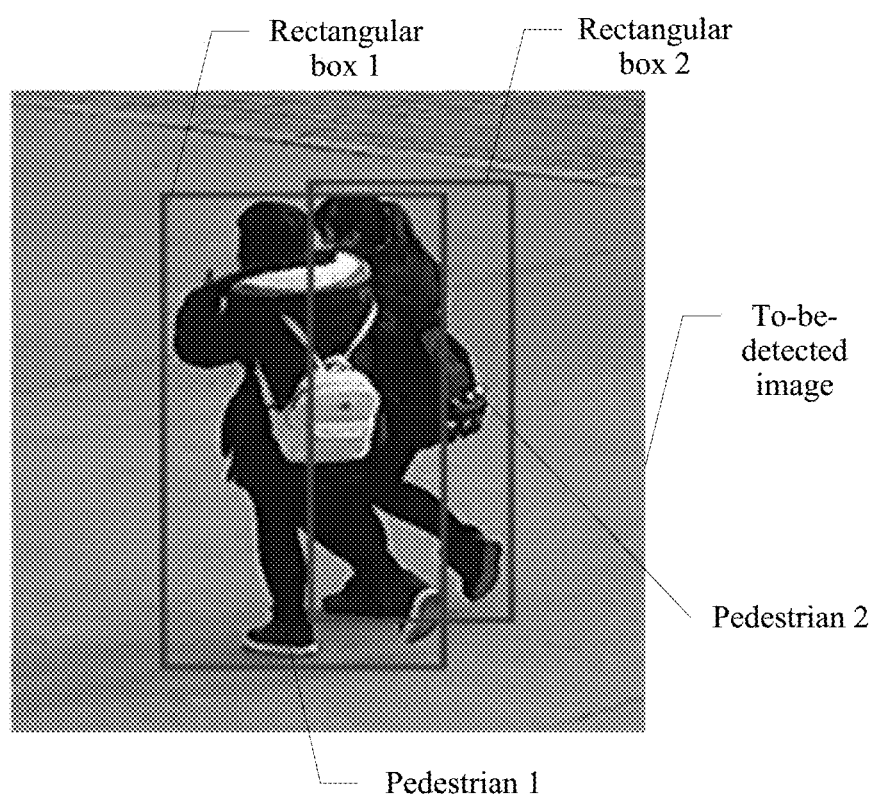
FIG. 5 is another schematic diagram of a pedestrian candidate region according to an embodiment of this application.

In some implementations, the target candidate region extraction unit 112 extracts a target candidate region (namely, a pedestrian candidate region, for ease of description, the pedestrian candidate region is used as an example below for description) for which a pedestrian is used as a detected object from the to-be-detected image. In a process of extracting the pedestrian candidate region, the target candidate region extraction unit 112 may enumerate pedestrian candidate regions, in a to-be-detected image in an actual pedestrian detection application scenario, that may include a pedestrian by learning real given features (for example, some image features used to express what the pedestrian looks like) of the pedestrian. FIG. 4 is a schematic diagram of a pedestrian candidate region according to an embodiment of this application. In this embodiment of this application, the pedestrian candidate regions in the to-be-detected image that are enumerated by the target candidate region extraction unit 112 include a region that actually includes a pedestrian, and may also include a region that may include a pedestrian but actually does not include the pedestrian. As shown in FIG. 4, the target candidate region extraction unit 112 may extract countless pedestrian candidate regions from the to-be-detected image, such as regions in densely distributed rectangular boxes in FIG. 4, including regions that actually include a pedestrian, such as a region 1, a region 2, a region 3, and a region 4 in white rectangular boxes. In this embodiment of this application, the pedestrian candidate region may be specifically an image region corresponding to a candidate rectangular box of a pedestrian. This is not limited herein. For ease of description, an example in which the pedestrian candidate region is a region that actually includes a pedestrian may be used below for description. FIG. 5 is another schematic diagram of a pedestrian candidate region according to an embodiment of this application. The target candidate region extraction unit 112 may extract, from the to-be-detected image, an external rectangular box of a pedestrian that may include the pedestrian, for example, an external rectangular box (namely, a rectangular box 1) of a pedestrian 1 and an external rectangular box (namely, a rectangular box 2) of a pedestrian 2; and determine an image region corresponding to the rectangular box 1 and an image region corresponding to the rectangular box 2 as target candidate regions in which a pedestrian is used as a detected object.

Optionally, the target candidate region extraction unit 112 may first obtain an initial RPN model. The initial RPN model has an initial network parameter, and the initial RPN model may frame a foreground region or a background from an image by using the initial network parameter of the initial RPN model. The target candidate region extraction unit 112 may initialize the initial RPN model by using a network model framework of the initial RPN model, use a pedestrian sample image used for pedestrian detection to train, for the initial RPN model, a function of using a pedestrian as a detected object. A network parameter of the initial RPN model is adjusted by training the initial RPN model, so that a network parameter of a trained RPN model is a network parameter applicable to framing of a pedestrian or a background. This process may be referred to as a process in which the initial RPN model is finely adjusted to construct a network model applicable to pedestrian detection. The RPN model obtained through training may be a target PRN model used to implement a function of extracting a region in which a pedestrian is used as a detected object. The network parameter of the target PRN model may be obtained by training a pedestrian sample image for which a pedestrian is used as a detected object, and therefore the target PRN model may be better applicable to pedestrian detection. After the target RPN model is constructed, a plurality of rectangular box regions that may include a pedestrian may be determined from the to-be-detected image with reference to a window sliding method. For example, by using a window sliding method and with reference to the deep feature (namely, the image feature extracted by using a pedestrian as a whole) extracted from the last convolution layer of the convolutional neural network by using a convolution core of the convolutional neural network, frame-by-frame image feature sliding is performed on the deep feature, and a confidence level at which an image feature slid each time includes a feature of the pedestrian, namely, the detected object, is calculated in a sliding process. The confidence level at which the image feature slid each time includes the feature of the pedestrian, namely, the detected object, is a probability that the image feature includes the pedestrian, and a higher confidence level indicates a higher probability that the image feature includes the pedestrian. The extracted deep feature is slid by using the sliding window method, so that a plurality of candidate regions may be determined from the to-be-detected image (for ease of description, rectangular box regions are used as an example below for description). An image in a region in a rectangular box (which may be referred to as a rectangular box region for ease of description) is a candidate box feature map. After the plurality of rectangular box regions are determined from the to-be-detected image, a candidate box feature map may be selected from candidate box feature maps corresponding to the rectangular box regions, where a confidence level at which the selected candidate box feature map includes a pedestrian image feature is greater than or equal to a preset threshold. A candidate region corresponding to the selected candidate box feature map is used as a pedestrian candidate region (namely, the target candidate region), for example, an external rectangular box of the pedestrian. In this embodiment of this application, a confidence level at which a pedestrian candidate region includes a pedestrian may also be understood as a possibility that the to-be-detected image has a detected target such as the pedestrian in this region, and may not only indicate a possibility that the to-be-detected image includes the pedestrian, but also may indicate a possibility that the pedestrian is in this region. This is not limited herein. This region corresponds to a location of the pedestrian in the candidate box feature map in the process of performing frame-by-frame image feature sliding on the deep feature. The location may also be restored to a corresponding location in the to-be-detected image, and then a location of the pedestrian in the to-be-detected image may be determined.

Optionally, the image feature corresponding to the pedestrian candidate region may be a global image feature extracted by using a pedestrian as a detected target, that is, an image feature of a candidate rectangular box region of the pedestrian, for example, an image feature of a region in the rectangular box 1 shown in FIG. 5. In this embodiment of this application, the global image feature may also be referred to as an overall image feature. The overall image feature may be a feature used to indicate a pedestrian image in a candidate rectangular box region of a pedestrian, that is, an image feature extracted by using the pedestrian as a whole. The overall image feature corresponds to the target candidate region, that is, corresponds to the candidate rectangular box region of the pedestrian herein. For ease of description, the overall image feature is used as an example below for description. Corresponding to the image feature extracted by using a pedestrian as a whole, an image feature extracted for a pedestrian part that is a local pedestrian detail may be referred to as a local image feature. The overall image feature may be used to be merged with a part relationship feature used to describe a relationship between parts of a pedestrian, to determine whether the to-be-detected image includes a pedestrian or a location of the included pedestrian in the to-be-detected image (for example, a location, in the to-be-detected image, of a candidate rectangular box region of the pedestrian that includes the pedestrian).

S302. Determine, by using an image segmentation network from the target candidate region, part candidate regions respectively corresponding to at least two parts, where each part candidate region corresponds to one part of a to-be-detected target; and extract, from the to-be-detected image, local image features corresponding to the part candidate regions.

Figure 6A:
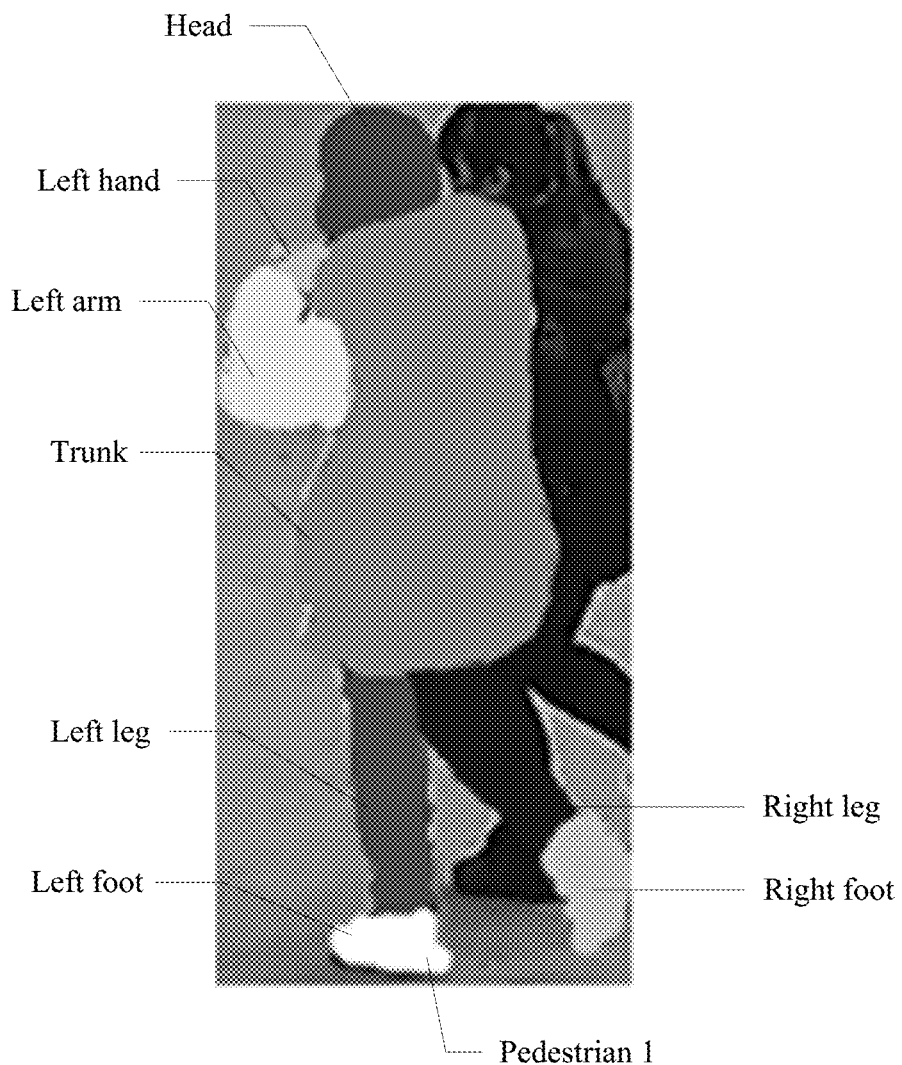
FIG. 6A is a schematic diagram of a pedestrian part according to an embodiment of this application.
Figure 6B:
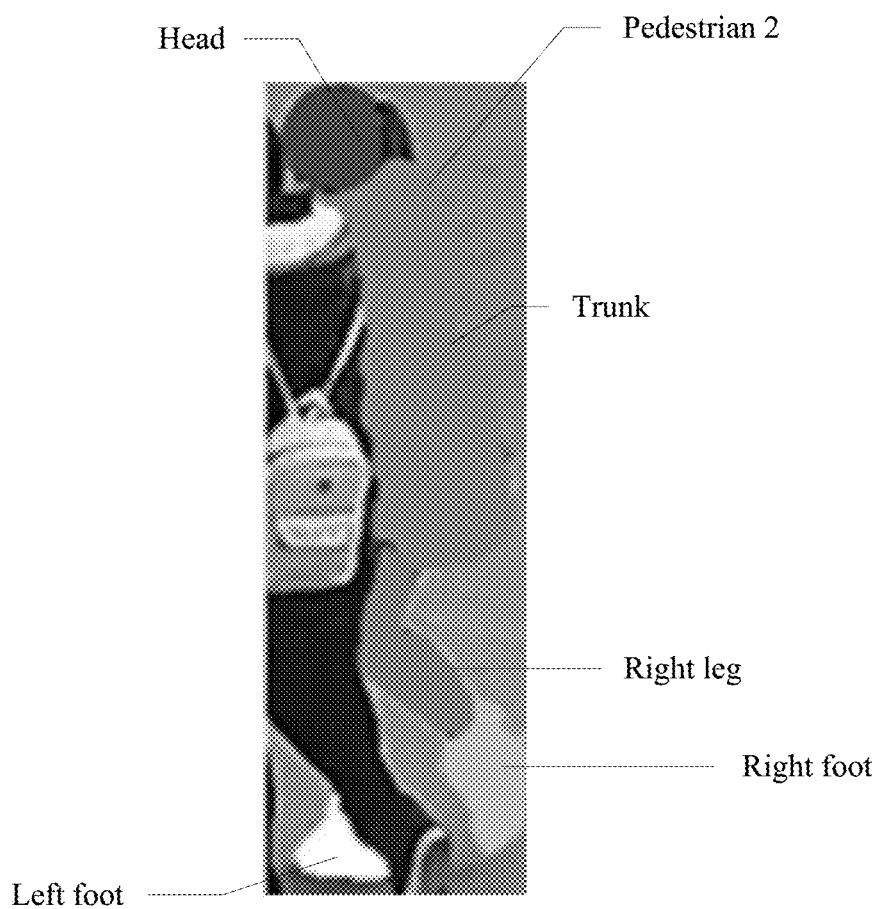
FIG. 6B is a schematic diagram of a pedestrian part according to an embodiment of this application.

In some implementations, after determining the pedestrian candidate region in the to-be-detected image, the target candidate region extraction unit 112 may perform pedestrian part segmentation in the pedestrian candidate region by using the image segmentation unit 113, so as to determine, from the pedestrian candidate region, a part candidate region corresponding to each pedestrian part. The pedestrian candidate region may include a region that actually includes a pedestrian, and may also include a region that may include a pedestrian but actually does not include the pedestrian. This is not limited herein. For ease of description, an example in which the pedestrian candidate region is a region that actually includes a pedestrian may be used below for description. FIG. 6A is a schematic diagram of a pedestrian part according to an embodiment of this application. With reference to FIG. 5, in the rectangular box 1 shown in FIG. 5, visible pedestrian parts corresponding to the pedestrian 1 include a head, a left hand, a left arm, a trunk, a left leg, a left foot, a right leg, and a right foot shown in FIG. 6A. For the pedestrian 1, a region corresponding to any one of the pedestrian parts: the head, the left hand, the left arm, the trunk, the left leg, the left foot, the right leg, and the right foot of the pedestrian 1 in FIG. 6A is a part candidate region corresponding to the pedestrian part. For another example, FIG. 6B is a schematic diagram of a pedestrian part according to an embodiment of this application. In the rectangular box 2 shown in FIG. 5, because the pedestrian 1 and the pedestrian 2 directly block each other, visible pedestrian parts corresponding to pedestrian 2 include a head, a trunk, a right leg, a right foot, and a left foot shown in FIG. 6B. For the pedestrian 2, a region corresponding to any one of the pedestrian parts: the head, the trunk, the right leg, the right foot, and the left foot of the pedestrian 2 in FIG. 6B is a part candidate region corresponding to the pedestrian part of the pedestrian 2.

Optionally, if the pedestrian candidate region is a region that may include a pedestrian but actually does not include a pedestrian, the image segmentation unit 113 may perform pedestrian part segmentation in the pedestrian candidate region through predictive determining, so as to determine, from the pedestrian candidate region, a part candidate region corresponding to each pedestrian part. This may be specifically determined according to an actual application scenario, and is not limited herein.

In some implementations, the image segmentation unit 113 may extract, from the to-be-detected image, the local image feature corresponding to each part candidate region, so as to obtain a local image feature corresponding to each pedestrian part. One pedestrian part candidate region corresponds to one group of local image features, that is, one pedestrian part corresponds to one group of local image features. Optionally, the image segmentation unit 113 may construct an image segmentation network used for pedestrian detection, and obtain a pedestrian part by using the image segmentation network, so that pedestrian part division is more fine and a quantity of pedestrian parts may be flexibly adjusted according to an actual application scenario, thereby more accurately capturing a posture change or a blocking status of a pedestrian.

Optionally, the image segmentation network provided in this embodiment of this application may be a fully convolutional network (FCN). When the fully convolutional network is used to extract, from the to-be-detected image, the local image feature corresponding to each part, the to-be-detected image may be first input to the fully convolutional network, and prediction results that are of pixels in the to-be-detected image and that correspond to pedestrian parts are output by using the fully convolutional network. Further, the prediction results that are of the pixels and that correspond to the pedestrian parts may be divided by using the fully convolutional network, to obtain a part candidate region corresponding to each part. Pixels whose prediction results belong to a same part may be grouped into a part candidate region corresponding to the part. A part candidate region may be represented as a candidate region of a part of a pedestrian, and therefore part candidate regions of a plurality of parts of a plurality of pedestrians may be obtained. An image feature extracted from each part candidate region may be used as a local image feature corresponding to a pedestrian part indicated by the part candidate region. If a plurality of part candidate regions are extracted from the to-be-detected image, an image feature of each part candidate region may be extracted and used as a local image feature corresponding to each pedestrian part. For example, in FIG. 6A, the head of the pedestrian 1 corresponds to a part candidate region (for ease of description, it may be assumed that the part candidate region is a part candidate region 11), and an image feature of the part candidate region 11 is a local image feature corresponding to the head of the pedestrian 1. Likewise, an image feature extracted from a part candidate region corresponding to another pedestrian part of the pedestrian 1 is a local image feature corresponding to the another pedestrian part of the pedestrian 1. An image feature extracted from a part candidate region corresponding to each pedestrian part of the pedestrian 2 is a local image feature corresponding to the pedestrian part of the pedestrian 2. When pedestrian parts are identified and divided by using the fully convolutional network, a pixel-level image feature may be identified, to obtain a pixel-level local image feature. This has higher division precision than conventional rectangular box part division, and therefore is more fitted to a complex and variable actual scenario. Therefore, the target detection method has higher applicability.

Optionally, in this embodiment of this application, pedestrian parts may include a head, a left arm, a right arm, a left hand, a right hand, a trunk (for example, an upper body), a left leg, a right leg, a left foot, a right foot, and the like. This is not limited herein. The to-be-detected image may include one or more of the pedestrian parts. The image segmentation unit 113 may use the fully convolutional network to extract, from the to-be-detected image, a local image feature corresponding to each part, so as to determine a relationship between the pedestrian parts by using the local image feature corresponding to each part.

S303. Learn the local image features of the part candidate regions by using a bidirectional LSTM, to obtain a part relationship feature used to describe a relationship between the part candidate regions.

In some implementations, after obtaining the local image feature corresponding to each pedestrian part, the image segmentation unit 113 may learn a relationship between pedestrian parts by using the part relationship learning unit 114. Optionally, the part relationship learning unit 114 sorts the local image features of the part candidate regions in a preset part sequence to obtain a sorted feature sequence, and inputs the feature sequence to the bidirectional LSTM. The preset part sequence may be: a head, a left arm, a right arm, a left hand, a right hand, an upper body, a left leg, a right leg, a left foot, and a right foot. This may be specifically determined according to an actual application scenario requirement, and is not limited herein. The part relationship learning unit 114 may learn the relationship between the part candidate regions by using the bidirectional LSTM and by using a binary classification problem distinguishing between a pedestrian and a background as a learning task. For example, the bidirectional LSTM may obtain a relationship between regions through learning. A specific type of a region may be determined according to an actual application scenario. For example, in a pedestrian detection application scenario, the relationship between the regions is specifically a relationship between part candidate regions corresponding to pedestrian parts. Therefore, when the relationship between the regions is learned by using the bidirectional LSTM, a learning objective needs to be further set for the bidirectional LSTM, that is, a binary classification problem used to determine whether a part candidate region is a pedestrian or a background is used as the learning objective. Further, the relationship between the part candidate regions of the pedestrian parts may be obtained by the bidirectional LSTM through learning.

Optionally, the relationship between the part candidate regions includes a relationship between the to-be-detected target and the part candidate regions, and a dependency relationship between the part candidate regions. The relationship between the to-be-detected target and the part candidate regions includes: a relationship that is between a same detected target to which the part candidate regions belong and the part candidate regions and that exists when the part candidate regions belong to the same to-be-detected target, and/or a relationship that is between each of the part candidate regions and a to-be-detected target to which the part candidate region belongs and that exists when the part candidate regions belong to different to-be-detected targets. For example, when the part candidate regions belong to a same to-be-detected target, each of the part candidate regions belongs to which part is which one of a head, a trunk, or an arm of the detected target. The dependency relationship between the part candidate regions may include a connection relationship between parts corresponding to the part candidate regions. For example, a head is connected to a trunk, a left arm is connected to the left of the trunk, and a right arm is connected to the right of the trunk. This is not limited herein.

Optionally, the part relationship learning unit 114 may model and learn the relationship between the part candidate regions based on the local image feature that corresponds to each pedestrian part and that is extracted by the image segmentation unit 113, and extract a feature that may describe the relationship between the pedestrian parts. For example, it is assumed that pedestrian parts may include 10 parts: a head, a left arm, a right arm, a left hand, a right hand, a trunk, a left leg, a right leg, a left foot, and a right foot. The part relationship learning unit 114 may first construct a bidirectional LSTM model, combine local image features that correspond to the parts and that are extracted by the image segmentation unit 113, to obtain a feature sequence, input the feature sequence to the constructed bidirectional LSTM model, and learn a relationship between the pedestrian parts by using the bidirectional LSTM model and by using a binary classification problem distinguishing between a pedestrian and a background as a learning objective.

In some implementations, the bidirectional LSTM provided in this embodiment of this application includes a plurality of LSTM memory units, and parameters in the LSTM memory units may be determined by using the following formulas 1 to 5.

The formulas 1 to 5 meet the following:

$$i_t = \sigma(W_i x_t + U_i h_{t-1}) \qquad (1)$$

$$f_t = \sigma(W_f x_t + U_f h_{t-1}) \qquad (2)$$

$$o_t = \sigma(W_o x_t + U_o h_{t-1}) \qquad (3)$$

$$c_t = f_t c_{t-1} + i_t \varphi(W_c x_c + U_c h_{t-1}) \qquad (4)$$

$$h_t = o_t \varphi(c_t) \qquad (5)$$

In the formulas 1 to 5, $\sigma(x)$ and $\varphi(x)$ both are non-linear activation functions, where $\sigma(x)$ is a sigmoid function and meets $\sigma(x) = (1+\exp(-x))^{-1}$; and $\varphi(x)$ is a tan h function and meets $\varphi(x) = \tan h(x)$.

In this embodiment of this application, the local image features corresponding to the part candidate regions are serially connected in the preset part sequence to form the feature sequence, and the feature sequence is input to the bidirectional LSTM. Therefore, a local image feature that is input at a moment t corresponds to a part candidate region, and therefore in the formulas 1 to 5, the variable t may correspond to a part candidate region.

$x_t$ represents a local image feature that corresponds to a part candidate region and that is input at the moment t; $i_t$, $f_t$, and $o_t$ respectively represent probabilities, output at the moment t by an input gate, a memory gate, and an output gate, that the local image feature that is input at the moment t corresponds to a pedestrian part. The input gate, the memory gate, and the output gate are collectively referred to as logic gates of the LSTM memory unit. $c_t$ represents information of a pedestrian part indicated by the local image feature that is input at the moment t. For ease of description, the information may be referred to as information about the LSTM memory unit at a current moment t.

In the bidirectional LSTM network provided in this embodiment of this application, during calculation of the information about the LSTM memory unit at the current moment t and calculation of the probabilities that are output by the logic gates (the input gate, the output gate, and the memory gate) in the LSTM memory unit, input $x_t$ corresponding to each part candidate region at the current moment t and a weight transformation matrix W of an implied variable $h_{t-1}$ corresponding to each part candidate region at a previous moment t−1 separately exist, for example, $W_i$ corresponding to $i_t$, $W_f$ corresponding to $f_t$, $W_o$ corresponding to $o_t$, $W_c$ corresponding to $c_t$, and the like. The implied variable $h_{t-1}$ may be determined by output of the output gate and the memory unit at the previous moment t−1. The implied variable is an invisible status variable, and is a parameter relative to an observable variable. The observable variable may include a feature that can be directly obtained from the to-be-detected image. The implied variable is a variable at an abstract concept layer higher than a concept layer of the observable variable, and the implied variable is a parameter that can be used to control a change of the observable variable.

The bidirectional LSTM provided in this embodiment of this application is a network module that constantly uses context (context) information of an input feature sequence. Therefore, data obtained through processing at the current moment t, data obtained through processing at the previous moment t−1, and data obtained through processing at a next moment t+1 may be mutually nested. For example, output that is of each logic gate of the LSTM memory unit and that corresponds to the current moment t and output of the memory unit at the current moment t are obtained through processing under a function of the weight transformation matrix W by using a local image feature $x_t$ that is input at the moment t and an implied variable $h_{t-1}$ obtained through processing at the previous moment t−1. Finally, an implied variable $h_{t+1}$ at the next moment t+1 is obtained based on the output of the memory unit and the output gate at the current moment t.

In this embodiment of this application, output of the bidirectional LSTM is the part relationship feature indicating the relationship between the part candidate regions, and the part relationship feature is an output sequence corresponding to an input feature sequence. Therefore, the part relationship learning unit 114 may merge, in a sequence dimension by using a method such as linear weighting, output results obtained when the bidirectional LSTM model learns a relationship between pedestrian parts, to obtain part relationship features of a to-be-detected pedestrian in different posture change cases and blocking cases. For example, that the output results of the bidirectional LSTM model are merged in the sequence dimension through linear weighting may be adding a coefficient to a feature that is in the output sequence and that corresponds to each moment, and 1 is obtained after all coefficients are added up. Further, each feature may be multiplied by a coefficient corresponding to the feature, and then all features obtained through multiplication are added, to obtain the part relationship feature obtained by performing merging through linear weighting.

In this embodiment of this application, in a process in which the part relationship learning unit 114 learns the relationship between the pedestrian parts by using the bidirectional LSTM model, the output result of the bidirectional LSTM model is the part relationship feature indicating the relationship between the parts. The part relationship feature is a feature used to describe the relationship between the part candidate regions. The part relationship feature may be directly sent to a local classifier to obtain a classification result (that is, a detection result) indicating whether a pedestrian exists in a pedestrian candidate region in the to-be-detected image. The local classifier may be a network model that is pre-trained by using a local image feature, in a sample image, corresponding to a pedestrian part and that has a capability, obtained through training, of distinguishing between a pedestrian and a background. The local classifier may determine, based on an input local image feature, whether the local image feature is an image feature including a pedestrian or a background image feature that does not include a pedestrian. In addition, to increase a degree at which the overall image feature extracted by the feature extraction unit 111 fits to a pedestrian detection task, in this embodiment of this application, the part relationship feature obtained by the part relationship learning unit 114 through learning may be further merged with the overall image feature, to implement pedestrian detection in the to-be-detected image, thereby improving accuracy of pedestrian detection.

S304. Detect the to-be-detected target in the to-be-detected image based on the part relationship feature obtained by the bidirectional LSTM through learning.

In some implementations, the target prediction unit 115 detects the to-be-detected pedestrian in the to-be-detected image based on the part relationship feature obtained by the bidirectional LSTM through learning. The target prediction unit 115 may predict, based on the merged feature, whether the to-be-detected image includes the pedestrian or a location (namely, a location of a pedestrian candidate region including the pedestrian) of the pedestrian included in the to-be-detected image. Optionally, the target prediction unit 115 may merge, through multi-task learning, the overall image feature extracted by the feature extraction unit 111 with the part relationship feature obtained by the bidirectional LSTM through learning, send the merged feature to the local classifier, and learn, by using the local classifier, the merged feature to obtain a first confidence level of each of a category (for example, a pedestrian) and a location of the to-be-detected target in the to-be-detected image. In this embodiment of this application, the first confidence level indicates a prediction result of the local classifier on a possibility that a pedestrian candidate region includes a pedestrian. When the first confidence level is greater than or equal to a preset threshold, it may be determined that the prediction result of the local classification is that the pedestrian candidate region is a pedestrian region including a pedestrian; or when the first confidence level is less than a preset threshold, it may be determined that the pedestrian candidate region is a background region that does not include a pedestrian. If the pedestrian candidate region is a pedestrian region, a location of the pedestrian region in the to-be-detected image may be determined as a specific location of the pedestrian in the to-be-detected image. The overall image feature may be merged with the part relationship feature through linear weighting, serial connection, a convolution operation, or in another manner, and a merging manner may be determined according to a requirement in an actual application scenario. This is not limited herein. The merged feature is equivalent to enabling the overall image feature and the local image feature to be complementary to each other, while capturing a structure relationship at an overall layer and a part relationship at a part layer in various blocking cases, so that advantages of the overall structure relationship and the part relationship are complementary to each other, thereby improving accuracy of pedestrian detection. For example, the overall image feature is an image feature extracted by using a pedestrian as a whole, and represents an image feature of a pedestrian candidate region that may include a pedestrian in the to-be-detected image. The part relationship feature is an image feature that corresponds to a pedestrian part and that represents a relationship between pedestrian parts in a part candidate region, and represents a local image feature of each part of a pedestrian in a pedestrian candidate region that may include the pedestrian in the to-be-detected image. For example, the overall image feature is used to indicate that a pedestrian candidate region is a pedestrian region that may include a pedestrian, and may be used to predict a pedestrian posture at a whole layer, for example, an upright walking state, (parts do not block each other). The relationship between pedestrian parts that is represented by the part relationship feature includes two prediction results: a relationship between complete parts of a pedestrian (including all of a head, a left arm, a right arm, a left hand, a right hand, an upper body, a left leg, a right leg, a left foot, and a right foot), or a relationship between parts of two different pedestrians (features such as a head, a left arm, a right arm, a left hand, a right hand, an upper body, a left leg, a right leg, a left foot, and a right foot are parts of two pedestrians). Therefore, the overall image feature may be merged with the part relationship feature to select an image feature that indicates a higher precise pedestrian feature (a prediction result of a pedestrian is reserved). The merged feature may be a feature image that is used to predict, at an entire layer and a local layer, that a local image feature included in a part candidate region is a feature image corresponding to a pedestrian part. Overall determining by using the overall image feature and local judgment determining by using the local image feature compensate for each other, to implement pedestrian detection with higher precision and higher accuracy.

In this embodiment of this application, a classifier whose input is a part relationship feature corresponding to a pedestrian part and that predicts a pedestrian and a background by using the part relationship feature is referred to as a local classifier. Correspondingly, a classifier whose input is an overall image feature and that predicts a pedestrian by using the overall image feature is referred to as an overall classifier.

Optionally, the target prediction unit 115 may further send the overall image feature of the pedestrian candidate region to the overall classifier (for example, a Softmax classifier); determine a second confidence level at which the pedestrian candidate region includes the to-be-detected target by using the overall classification; determine, based on merging of the first confidence level and the second confidence level, that the to-be-detected image includes the to-be-detected target (namely, the pedestrian); and then may determine a location of the pedestrian based on a location of the pedestrian candidate region. In this embodiment of this application, the first confidence level is a prediction result of the local classifier on a possibility that a pedestrian candidate region includes a pedestrian, and is a prediction result determined at a pedestrian part layer. The second confidence level is a prediction result of the overall classifier on a possibility that a pedestrian candidate region includes a pedestrian, and is a prediction result determined at an overall pedestrian layer. When the second confidence level is greater than or equal to a preset threshold, it may be determined that the prediction result of the overall classification is that the pedestrian candidate region is a pedestrian region including a pedestrian; or when the second confidence level is less than a preset threshold, it may be determined that the prediction result is that the pedestrian candidate region is a background region that does not include a pedestrian. If the pedestrian candidate region is a pedestrian region, a location of the pedestrian region in the to-be-detected image may be determined as a specific location of the pedestrian in the to-be-detected image. In this embodiment of this application, the first confidence level is merged with the second confidence level, so that a more accurate prediction result may be obtained based on a prediction result corresponding to the first confidence level with reference to a prediction result corresponding to the second confidence level, thereby improving prediction precision of pedestrian detection. In this embodiment of this application, the overall image feature of the pedestrian candidate region in the to-be-detected image may be merged with the part relationship feature between the part candidate regions, and the overall image feature is merged with the local image feature, to obtain a richer feature expression, so that a more accurate detection result may be obtained.

Figure 7:
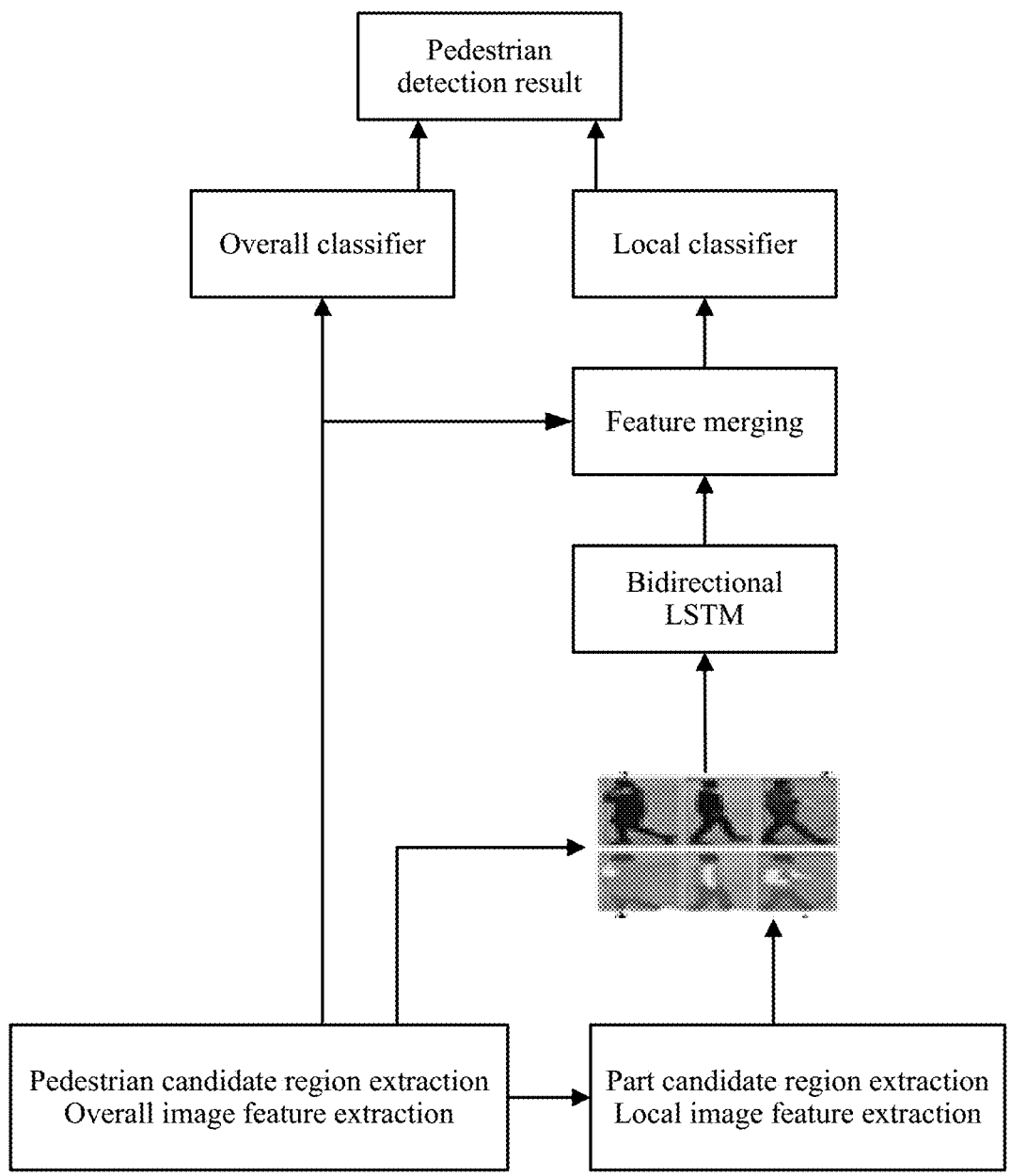
FIG. 7 is a schematic diagram of a to-be-detected image processing procedure in a pedestrian detection method according to an embodiment of this application.

A to-be-detected image processing procedure in a pedestrian detection method provided in an embodiment of this application is described below with reference to FIG. 7. FIG. 7 is a schematic diagram of a to-be-detected image processing procedure in a pedestrian detection method according to an embodiment of this application. In this embodiment of this application, a convolutional neural network is first used to extract a deep image feature for which a pedestrian is used as a detected object, and a pedestrian candidate region and an overall image feature corresponding to the pedestrian candidate region are extracted from a to-be-detected image. Then with reference to an image segmentation network, a local image feature used for part segmentation is extracted and part segmentation is performed in the pedestrian candidate region to obtain a plurality of part candidate regions. Further, local image features corresponding to pedestrian parts may be sent to a bidirectional LSTM model, so as to learn, by using the bidirectional LSTM model, a part relationship feature used to describe a relationship between the parts. The part relationship feature may be directly used as output of a pedestrian detection result, or may be further merged with the overall image feature of the pedestrian candidate region, to obtain output of a local classifier shown in FIG. 7. It is feasible that the output of the local classifier may be directly used as the output of the pedestrian detection result, and this is simple to operate. Alternatively, the output of the local classifier may be merged with output of an overall classifier that separately uses an overall image feature of a pedestrian, to obtain a pedestrian detection result shown in FIG. 7. The output of the overall classifier is merged with the output of the local classifier, so that interference caused by a part division error can be avoided, thereby improving accuracy of pedestrian detection. Therefore, the target detection method has higher applicability.

In this embodiment of this application, a part candidate region of a pedestrian may be obtained by using the image segmentation network, so that a part of the pedestrian is obtained more finely, and a posture change or a blocking status of the pedestrian in the to-be-detected image can be more flexibly captured. In addition, in this embodiment of this application, a relationship between parts of the pedestrian is obtained by using the bidirectional LSTM, and the part relationship feature that can be used to describe the relationship between the parts of the pedestrian is extracted, thereby further improving an image processing capability in a case of a pedestrian posture change or in a blocking status. Therefore, accuracy of identifying a pedestrian part is higher, and the target detection apparatus has higher applicability. Further, in this embodiment of this application, a multi-task learning manner is used to merge the overall image feature of the pedestrian candidate region in the to-be-detected image with the local image feature of each pedestrian part candidate region in the to-be-detected image, so as to diversify features used to determine whether the to-be-detected image includes a pedestrian or a location of a pedestrian in the to-be-detected image, so that different features restrain and promote each other, thereby increasing accuracy of pedestrian detection. In the pedestrian detection method provided in this embodiment of this application, the overall image feature of the pedestrian is merged with the part relationship feature of the pedestrian, so that the method is applicable not only to pedestrian detection in a scenario of a simple pedestrian posture change, but also to pedestrian detection in a scenario of a complex pedestrian posture change. In particular, when a pedestrian posture is changed to a relatively large extent or is relatively seriously blocked, a pedestrian detection rate is higher, and an application scope is wider.

Embodiment 2

In the pedestrian detection method described in Embodiment 1, in one aspect, an image segmentation network is constructed to obtain a part candidate region corresponding to each pedestrian part and a local image feature corresponding to each part candidate region, and a part relationship feature between the pedestrian parts is further learned by using a bidirectional LSTM model. In another aspect, the part relationship feature learned by the bidirectional LSTM model is merged with an overall image feature of a pedestrian candidate region, to implement pedestrian detection in a to-be-detected image, thereby enhancing an image processing capability of a target detection system for a pedestrian posture change and a blocking status in a complex application scenario, and implementing optimal detection on a pedestrian in an actual video surveillance scenario.

In addition, in this embodiment of this application, a pedestrian part that may be included in the to-be-detected image may be obtained based on two types of labeling information of the pedestrian: an overall rectangular box and a visible box. Then, an obtained image feature of the pedestrian part is sent to the bidirectional LSTM model, to learn a relationship between pedestrian parts. Further, pedestrian detection in the to-be-detected image may be implemented based on the part relationship feature learned by the bidirectional LSTM and the overall pedestrian feature of the pedestrian in the to-be-detected image.

Figure 8:
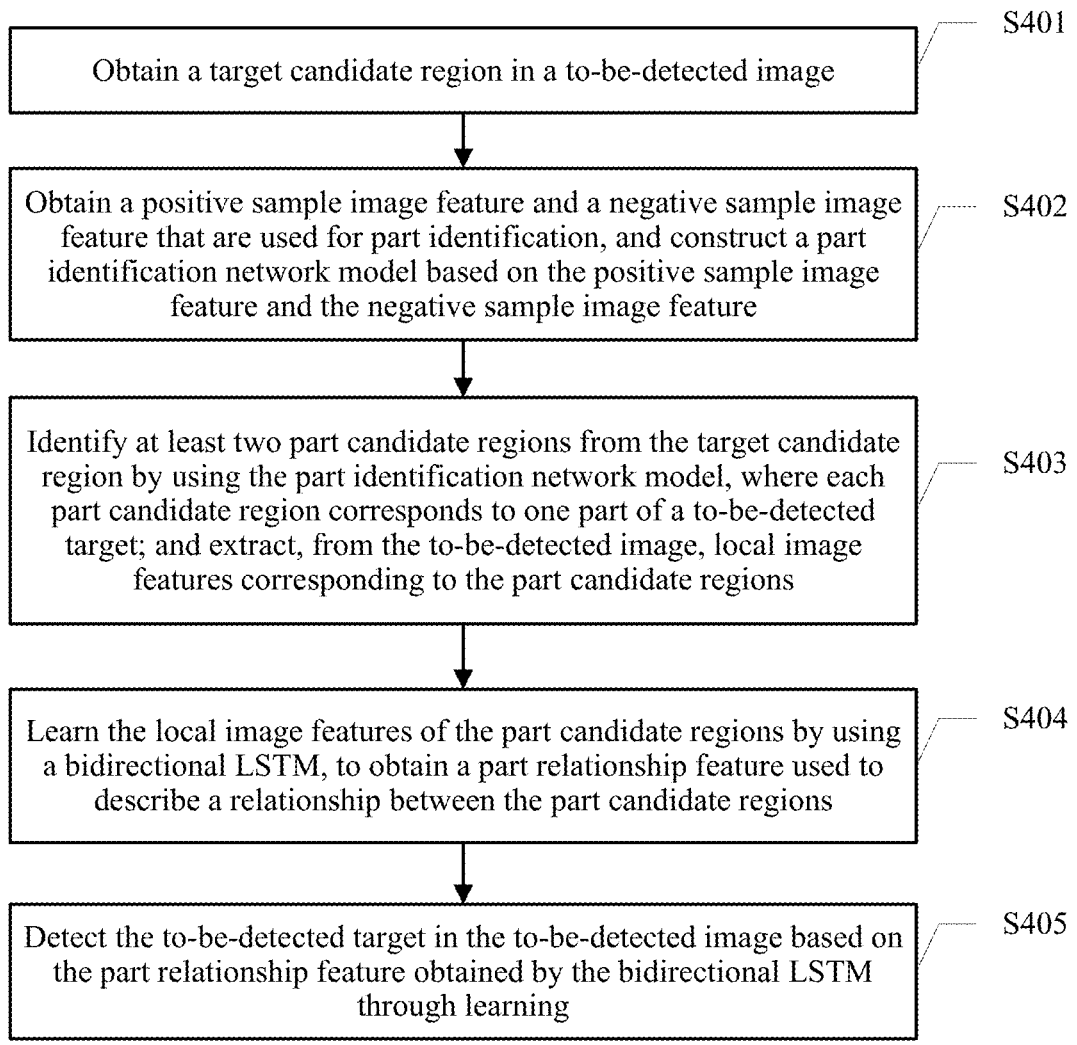
FIG. 8 is another schematic flowchart of a target detection method according to an embodiment of this application.

FIG. 8 is another schematic flowchart of a target detection method according to an embodiment of this application. The target detection method provided in this embodiment of this application may include the following steps.

S401. Obtain a target candidate region in a to-be-detected image.

Optionally, the feature extraction unit 111 extracts an image feature for which a pedestrian is used as a detected object, and determines a pedestrian candidate region from the to-be-detected image by using the target candidate region extraction unit 112. For an implementation in which the feature extraction unit 111 extracts, from the to-be-detected image, an overall image feature of the pedestrian candidate region, refer to the implementation described in step S301 in Embodiment 1. Details are not described herein again.

S402. Obtain a positive sample image feature and a negative sample image feature that are used for part identification, and construct a part identification model based on the positive sample image feature and the negative sample image feature.

Figure 9:
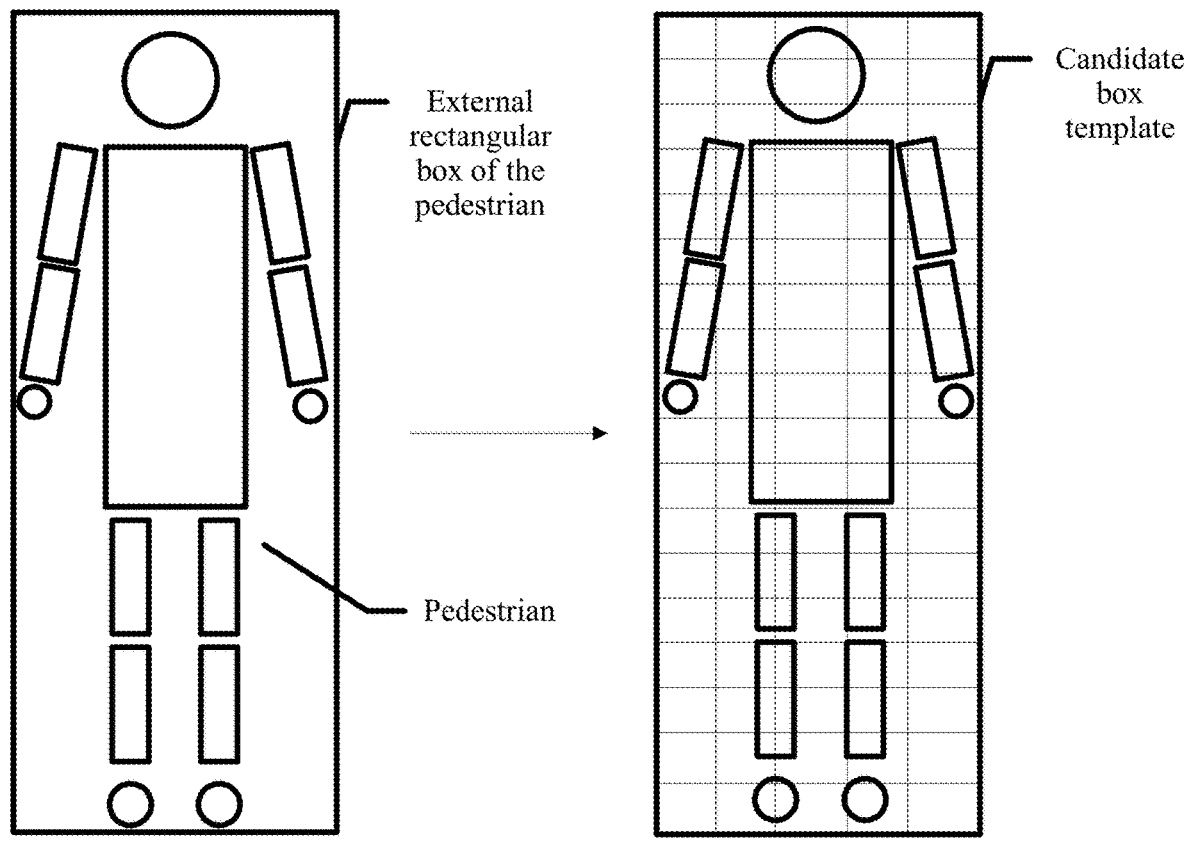
FIG. 9 is another schematic diagram of a pedestrian candidate region according to an embodiment of this application.

In some implementations, the image segmentation unit 113 constructs the part identification model by using the positive sample image and the negative sample image of the pedestrian, so as to identify, by using the constructed part identification model, a possible pedestrian part from the pedestrian candidate region and a local image feature corresponding to each pedestrian part. The image segmentation unit 113 may obtain, by using a candidate box template in which a pedestrian is used as a detected object, the positive sample image feature and the negative sample image feature that are used for pedestrian detection from a sample image used for pedestrian part identification. The candidate box template may be a pre-constructed template used for part identification function training, and the template is applicable to part identification function training of the part identification model used for pedestrian detection. FIG. 9 is another schematic diagram of a pedestrian candidate region according to an embodiment of this application. It is assumed that an ideal state of a pedestrian posture is that a pedestrian is in a center of an external rectangular box of the pedestrian. In this way, the external rectangular box of the pedestrian may be divided into N grids, and a grid covered by a region in which each part of the pedestrian is located in the pedestrian posture in the ideal state is determined from the N grids. N is an integer greater than 1. For example, it is first assumed that in an ideal case, a pedestrian is in a center of an external rectangular box of the pedestrian. In this case, the external rectangular box of the pedestrian is evenly divided into a quantity of grids, such as N grids. A grid covered in this ideal case by a region in which a pedestrian part such as a head, a trunk, a left arm, a right arm, a left leg, or a right leg is located may be further determined.

Figure 10:
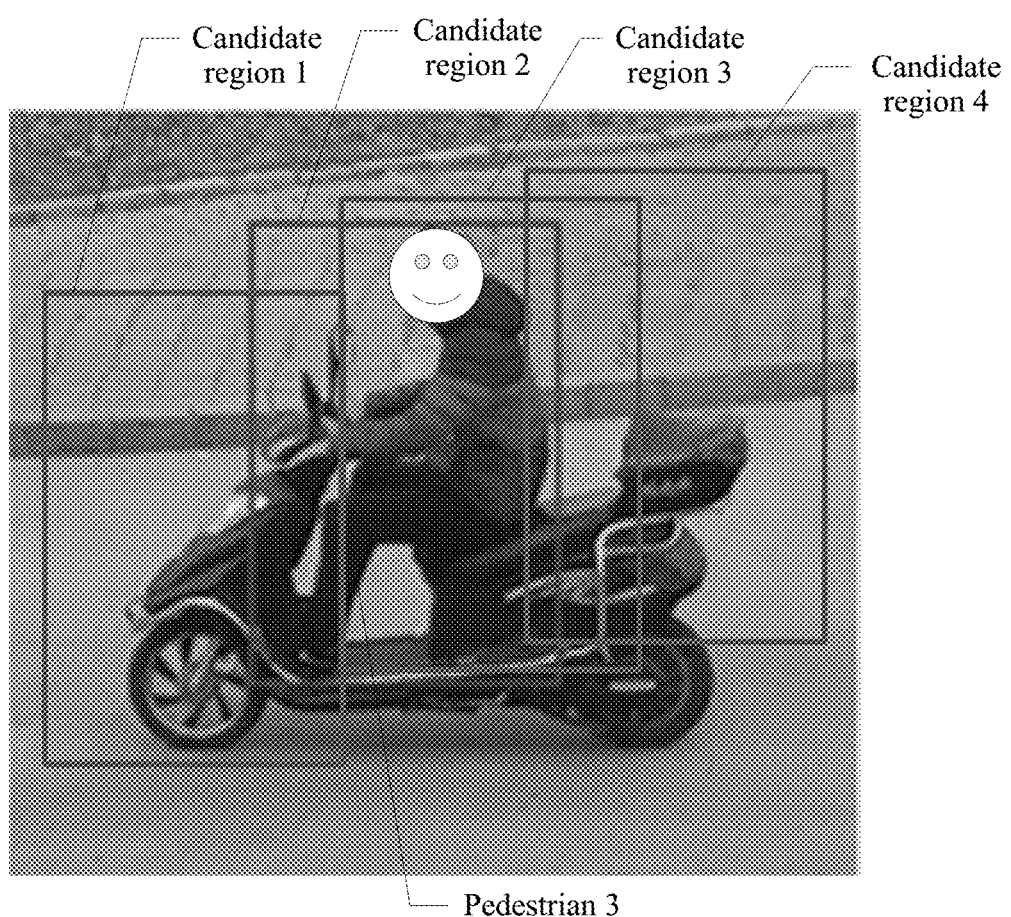
FIG. 10 is another schematic diagram of a pedestrian candidate region according to an embodiment of this application.

Optionally, the image segmentation unit 113 may obtain, from a data set used for pedestrian detection training, a sample image used for part identification. Any sample image is used as an example, and the image segmentation unit 113 may determine, from the sample image, a plurality of candidate regions in which a pedestrian is used as a detected object. FIG. 10 is another schematic diagram of a pedestrian candidate region according to an embodiment of this application. It is assumed that FIG. 10 shows a sample image. The sample image includes a pedestrian 3. The image segmentation unit 113 may determine, from the sample image, four candidate regions in which the pedestrian is used as a detected object, for example, a candidate region 1 to a candidate region 4. Further, the image segmentation unit 113 may determine a candidate region labeled with the pedestrian in the plurality of candidate regions as a positive sample region. For example, a candidate box 2, namely, an external rectangular box of the pedestrian 3, exactly boxes an entire contour of the pedestrian 3. Therefore, the candidate box 2 may be labeled in advance as a positive sample region used to identify the pedestrian 3. A candidate region whose intersection-over-union with the positive sample region is less than a preset proportion is determined as a negative sample region. Optionally, intersection-over-union of two regions may be understood as a ratio of an area of an intersection of the two regions to an area of union of the two regions. The preset proportion may be that intersection-over-union of two regions is less than 0.5. For example, as shown in FIG. 10, intersection-over-union of a candidate box 1 and the candidate box 2 is obviously less than 0.5, and therefore the candidate region 1 may be determined as a negative sample region. Intersection-over-union of the candidate box 3 and the candidate box 2 is obviously greater than 0.5, and therefore the candidate region 3 may be determined as a positive sample region. Further, the image segmentation unit 113 may divide the positive sample region into N grids, and determine, from the N grids of the positive sample region by using the candidate box template, a positive sample grid and a negative sample grid that correspond to each part. For example, the image segmentation unit 113 may use, as a positive sample region of the pedestrian, an actually labeled pedestrian box (namely, an actually labeled external rectangular box of the pedestrian) in the plurality of candidate regions; and determine, as negative sample regions of the pedestrian, local image regions corresponding to all candidate boxes whose intersection-over-union with the actually labeled pedestrian box is less than 0.5.

Figure 11:
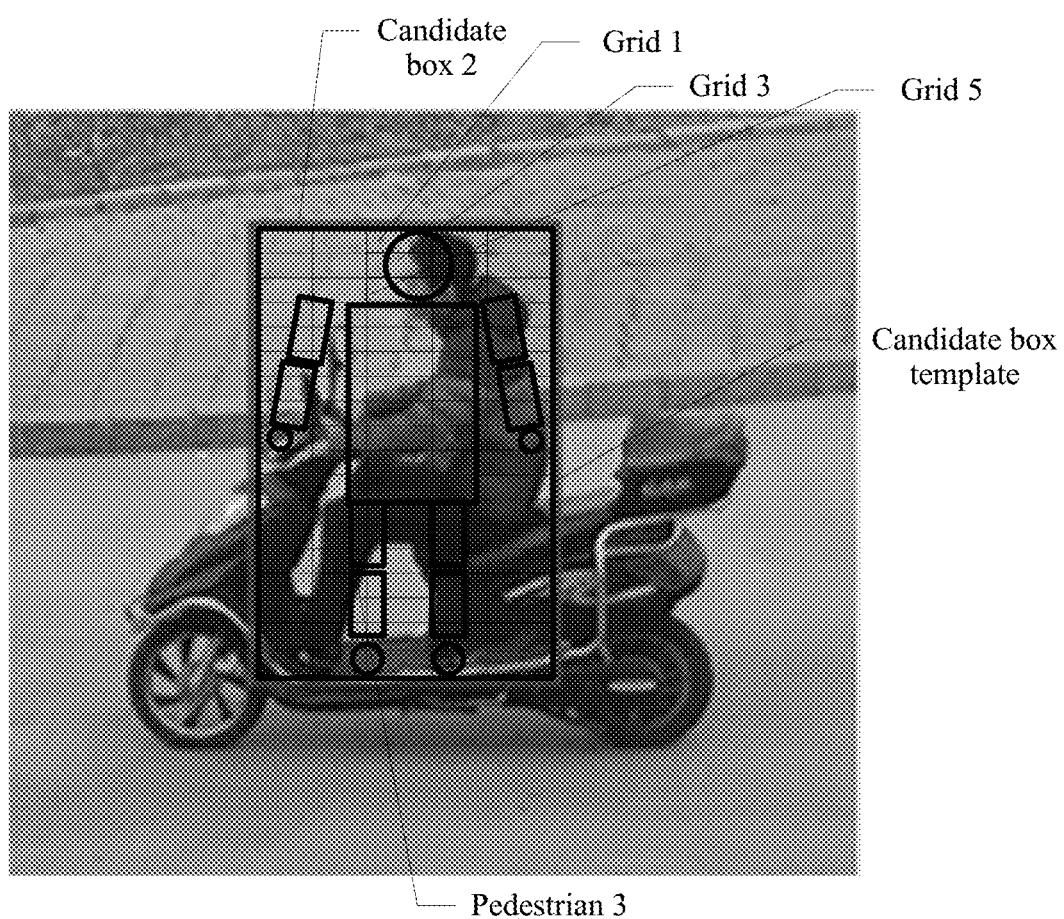
FIG. 11 is another schematic diagram of a pedestrian candidate region according to an embodiment of this application.

In any negative sample region (which is used as a rectangular box region corresponding to a negative sample candidate box) in all negative sample regions, the negative sample region is divided into N grids in the manner of dividing the candidate box template. A grid that corresponds to each pedestrian part and that is obtained by dividing any negative sample region is determined as a negative sample grid of the pedestrian part. For example, in N grids obtained by dividing a negative sample region, a grid corresponding to a head is determined as a negative sample grid of the head, a grid corresponding to a trunk is determined as a negative sample grid of the trunk, and the like. In any of all positive sample regions of the pedestrian, the positive sample region is divided into N grids in the manner of dividing the candidate box template, and then a part grid covered by each part is determined from the N grids of the positive sample region based on a grid that is in the candidate box template and that is covered by a region in which the part is located. In specific implementation, in any positive sample region, the positive sample region is actually labeled as a pedestrian box, but a posture of the pedestrian in the positive sample region cannot be determined, and a real location (different from a location in an ideal state) of each part of the pedestrian is also unknown. In the candidate box template, a specific location of each part of the pedestrian in an ideal case may be known. Therefore, the part grid covered by each part may be selected from the positive sample region by using the candidate box template, so as to determine the real location of each part of the pedestrian in the positive sample region. For example, FIG. 11 is another schematic diagram of a pedestrian candidate region according to an embodiment of this application. The candidate box 2 is used as an example. After the candidate box 2 used as a positive sample region is divided into N grids in the manner of dividing the candidate box template, a part grid covered by each pedestrian part may be determined from the candidate box 2 based on an ideal location of the pedestrian part in the candidate box template. For example, a part grid covered by a pedestrian head is determined from the N grids of the candidate box 2 based on an ideal location of the pedestrian head in the candidate box template, for example, six grids covered by the head in FIG. 11. Specifically, the six grids are numbered a grid 1, a grid 2 (not shown), a grid 3, a grid 4 (not shown), a grid 5, and a grid 6 (not shown) in a manner of seeing a person first horizontally and then vertically. This is not limited herein.

Further, it may be determined, from the positive sample region, a visible region that is of the pedestrian in a real pedestrian posture (different from a pedestrian posture in an ideal state) and that is included in the sample image, for example, a visible region of the pedestrian 3 in the candidate box 2. Visible regions of the pedestrian 3 in the candidate box 2 include regions covered by parts such as a head, a trunk, a left arm, a left hand, a right arm, a right hand, a left leg, a right leg, and a right foot. For ease of description, a visible region of a part may be referred to as a part-visible region of the part. In the positive sample region, a part-visible region of any part is a region covered by the part in the positive sample region. A visible region of any part may include one or more of the N grids, that is, any part may cover one or more grids in the positive sample region. Each grid may include a part of the part-visible region of the part. For example, as shown in FIG. 11, in the actually labeled candidate box 2, the head of the pedestrian 3 covers six grids: the grid 1 to the grid 6. In other words, a head-visible region of the pedestrian 3 in the candidate box 2 includes the grid 1 to the grid 6. Each of the grid 1 to the grid 6 includes a part of the head-visible region of the pedestrian 3. The image segmentation unit 113 may determine, based on an area of a part-visible region of a part in a grid, whether to determine the grid as a positive sample grid or a negative sample grid of the part. When a part grid covered by any part i includes a part grid j, and a degree at which a region covered by the part i in the part grid j overlaps a region of the part grid j is greater than or equal to a preset threshold, the part grid j is determined as a positive sample grid of the part i. A degree at which a visible region, of the part i, included in the part grid j overlaps the region of the part grid j is a ratio of an area of the visible region, of the part i, included in the part grid j to an area of the part grid j, where both i and j are natural numbers. For example, referring to FIG. 11, in the head-visible region shown in the candidate box 2, degrees at which the header-visible region overlaps the grid 1 to the grid 6 are compared. If a degree at which a head-visible region in the grid 1 overlaps the grid 1 is less than a preset threshold, the grid 1 may be determined as a negative sample grid of the head. If degrees at which visible regions in the grid 3 and the grid 5 overlap the grids are greater than the preset threshold, the grid 3 and the grid 5 may be determined as positive sample grids of the head. Likewise, a positive sample grid of each part other than the head may be determined from each positive sample region. When a degree at which a visible region of any part i' in any part grid j' covered by the part i' overlaps a region of the part grid j' is less than the preset threshold, the part grid j' is determined as a negative sample grid of the part i'. Likewise, a negative sample grid of each part other than the head may be determined from each negative sample region. For example, in a rectangular box region corresponding to any positive sample region, the image segmentation unit 113 may calculate a degree at which a part-visible region in each grid region in the rectangular box region overlaps the grid region, and a preset threshold is preset for an overlapping degree, to determine whether to add, to a positive sample grid of a pedestrian part, a grid covered by a visible region part of the pedestrian part. If a degree at which a visible region of a pedestrian part included in a grid overlaps a region of the grid is greater than or equal to the preset threshold, the grid is determined as a positive sample grid of the pedestrian part corresponding to the grid. To be specific, if a ratio of an area of a visible region of a pedestrian part included in the grid to an area of the grid is greater than or equal to the preset threshold, the grid is determined as a positive sample grid of the pedestrian part. If the degree at which the visible region of the pedestrian part included in the grid overlaps the region of the grid is less than the preset threshold, the grid is determined as a negative sample grid of the pedestrian part corresponding to the grid, so as to obtain a positive sample grid and a negative sample grid that correspond to each part of the pedestrian.

In this embodiment of this application, after obtaining the positive sample grid corresponding to each part, the image segmentation unit 113 may determine an image feature of each positive sample grid as a positive sample image feature of the part, and determine an image feature of a negative sample grid region of each part as a negative sample image feature of the part. In this embodiment of this application, the image segmentation unit 113 may determine, by using a massive number of sample images, the positive sample image feature and the negative sample image feature that correspond to each part of the pedestrian, thereby improving extraction accuracy of an image feature corresponding to the part, and improving accuracy of part segmentation of the pedestrian. In Embodiment 2, different from Embodiment 1, the image segmentation unit 113 does not extract a local image feature corresponding to each part by using an image segmentation network, but obtains, by using massive sample images, the positive sample image feature and the negative sample image feature that correspond to each part, thereby increasing a manner of extracting the local image feature corresponding to each part.

In some implementations, after obtaining the positive sample image feature and the negative sample image feature of each part, the image segmentation unit 113 may use the positive sample image feature of each part and the negative sample image feature of each part as input of a part identification model; and learn, by using the part identification model and by using a binary classification problem distinguishing between a pedestrian part and a background as a learning objective, a capability of obtaining a local image feature of a pedestrian part. For example, a VGG Net obtained by training an ImageNet data set may be first selected as an original network model used for training, and then a 1000-class classification problem in the original ImageNet data set is replaced with a binary classification problem distinguishing between a pedestrian part and a non-pedestrian part. The VGG Net is trained with reference to the positive sample image feature and the negative sample image feature that are used for part identification. An existing network model framework of the VGG Net is used, and the positive sample image feature and the negative sample image feature that are used for part identification is used to train, for the existing network model framework, a function of distinguishing between a pedestrian part and a non-pedestrian part. A network parameter of the VGG Net is adjusted by training the VGG Net, so that the network parameter of the VGG Net is a network parameter applicable to pedestrian part identification. This process may be referred to as a process of constructing a part identification model used for part identification.

S403. Determine, by using the part identification model from the target candidate region, part candidate regions respectively corresponding to at least two parts, where each part candidate region corresponds to one part of a to-be-detected target; and extract, from the to-be-detected image, local image features corresponding to the part candidate regions.

In some implementations, after obtaining, through training, the part identification model that has the capability of obtaining a local image feature of a pedestrian part, the image segmentation unit 113 may identify one or more part candidate regions from the pedestrian candidate region in the to-be-detected image by using the part identification model, and further extract, from the to-be-detected image, the local image features corresponding to the part candidate regions. Further, a relationship between pedestrian parts may be determined based on local image features corresponding to the pedestrian parts.

S404. Learn the local image features of the part candidate regions by using a bidirectional LSTM, to obtain a part relationship feature used to describe a relationship between the part candidate regions.

S405. Detect the to-be-detected target in the to-be-detected image based on the part relationship feature obtained by the bidirectional LSTM through learning.

Optionally, for an implementation in which the relationship between the part candidate regions is learned by using the bidirectional LSTM, and the pedestrian in the to-be-detected image is detected based on the part relationship feature obtained by the bidirectional LSTM through learning and with reference to the overall image feature of the pedestrian in the to-be-detected image, refer to the implementation described in steps S303 and S304 in Embodiment 1. Details are not described herein again.

In this embodiment of this application, in an earlier data preparation phase in the implementation provided in Embodiment 2, parts of the pedestrian do not need to be separately labeled, and neither a pixel-level label nor a rectangular box label is required. Therefore, workload caused by data obtaining in an earlier training phase can be reduced, thereby greatly reducing a time consumed for earlier data preparation. This is simpler to operate, and implementation complexity of pedestrian detection is reduced. An implementation different from that used in Embodiment 1 is used in Embodiment 2 to identify a pedestrian part, so as to diversify manners of identifying the pedestrian part, and diversify implementations of pedestrian detection in the to-be-detected image.

In this embodiment of this application, the target detection apparatus 11 shown in FIG. 2 may be configured to perform the target detection method provided in Embodiment 1 and/or Embodiment 2 by using units (or modules) included in the target detection apparatus 11. To better distinguish between different operations performed by the built-in units of the target detection apparatus 11 when the target detection apparatus 11 performs different embodiments (for example, Embodiment 3 and Embodiment 4), a target detection apparatus 21 and a target detection apparatus 31 are used as examples below for description. The target detection apparatus 21 may be an apparatus configured to perform the target detection method provided in Embodiment 1, and the target detection apparatus 31 may be an apparatus configured to perform the target detection method provided in Embodiment 2. Implementations performed by the target detection apparatuses provided in the embodiments of this application are described below with reference to FIG. 12 to FIG. 13.

Embodiment 3

Figure 12:
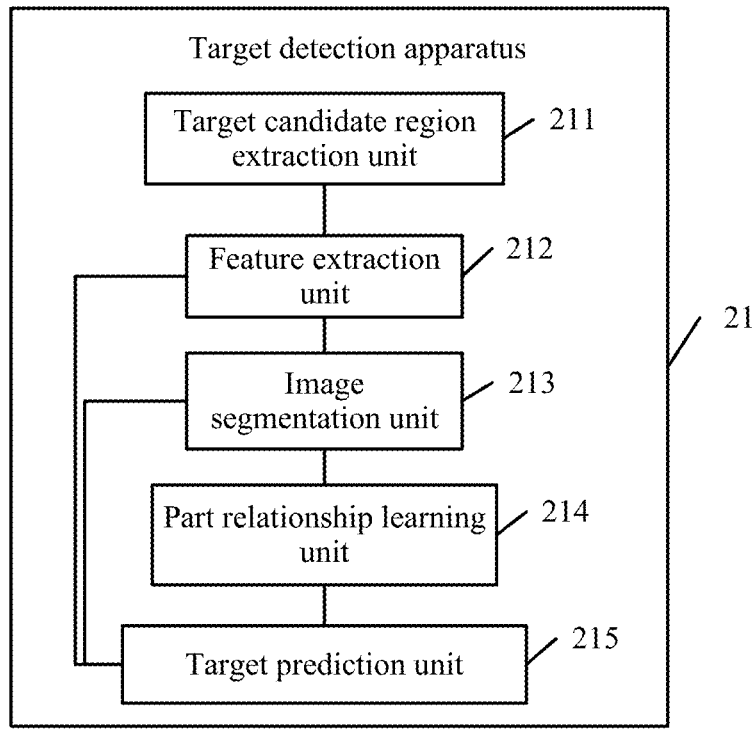
FIG. 12 is another schematic structural diagram of a target detection apparatus according to an embodiment of this application.

FIG. 12 is another schematic structural diagram of a target detection apparatus according to an embodiment of this application. In this embodiment of this application, a target detection apparatus 21 may include a target candidate region extraction unit 211, an image segmentation unit 213, a part relationship learning unit 214, and a target prediction unit 215.

The target candidate region extraction unit 211 is configured to obtain a target candidate region, in a to-be-detected image, for which a target is used as a detected object.

The image segmentation unit 213 is configured to determine, by using an image segmentation network, at least two part candidate regions from the target candidate region extracted by the target candidate region extraction unit 211, where each part candidate region corresponds to one part of a to-be-detected target; and extract, from the to-be-detected image, local image features corresponding to the part candidate regions.

The part relationship learning unit 214 is configured to learn, by using a bidirectional LSTM, the local image features of the part candidate regions extracted by the image segmentation unit 213, to obtain a part relationship feature used to describe a relationship between the part candidate regions.

The target prediction unit 215 is configured to detect the to-be-detected target in the to-be-detected image based on the part relationship feature obtained by the part relationship learning unit 213.

Optionally, the target detection apparatus may further include a feature extraction unit 212.

In some implementations, the feature extraction unit 212 is configured to obtain a global image feature that is in the to-be-detected image and that corresponds to the target candidate region extracted by the target candidate region extraction unit 211.

The target prediction unit 215 is configured to determine the to-be-detected target in the to-be-detected image based on the part relationship feature obtained by the part relationship learning unit 214 and with reference to the global image feature obtained by the feature extraction unit 212.

In some implementations, the target prediction unit 215 is configured to: merge the part relationship feature obtained by the part relationship learning unit 214 with the global image feature obtained by the feature extraction unit 212; obtain, through learning, a first confidence level of each of a category and a location of the to-be-detected target in the to-be-detected image based on a merged feature; determine, based on the global image feature, a second confidence level at which the target candidate region obtained by the target candidate region extraction unit includes the to-be-detected target, and determine, based on merging of the first confidence level and the second confidence level, that the to-be-detected image includes the to-be-detected target; and determine a location of the to-be-detected target in the to-be-detected image based on a location, in the to-be-detected image, of the target candidate region including the to-be-detected target.

In some implementations, the part relationship learning unit 214 is configured to: sort, in a preset part sequence, the local image features of the part candidate regions extracted by the image segmentation unit 213 to obtain a sorted feature sequence, and input the sorted feature sequence to the bidirectional LSTM; and learn, by using the bidirectional LSTM, the relationship between the part candidate regions by using a binary classification problem distinguishing between a target and a background as a learning task.

In some implementations, the relationship between the part candidate regions includes at least one of a relationship between the detected target and the part candidate regions, or a dependency relationship between the part candidate regions. The relationship between the detected target and the part candidate regions includes: a relationship that is between a same detected target to which the part candidate regions belong and the part candidate regions and that exists when the part candidate regions belong to the same detected target, and/or a relationship that is between each of the part candidate regions and a detected target to which the part candidate region belongs and that exists when the part candidate regions belong to different detected targets.

In specific implementation, the target detection apparatus 21 may perform the implementations provided in steps in Embodiment 1 by using the built-in units of the target detection apparatus 21. For details, refer to the implementation performed by a corresponding unit in Embodiment 1. Details are not described herein again.

In this embodiment of this application, a part candidate region of a pedestrian may be obtained by using the image segmentation network, so that a part of the pedestrian is obtained more finely, and a posture change or a blocking status of the pedestrian in the to-be-detected image can be more flexibly captured. In addition, in this embodiment of this application, a relationship between parts of the pedestrian is obtained by using the bidirectional LSTM, and the part relationship feature that can be used to describe the relationship between the parts of the pedestrian is extracted, thereby further improving an image processing capability in a case of a pedestrian posture change or in a blocking status. Therefore, accuracy of identifying a pedestrian part is higher, and the target detection apparatus has higher applicability. Further, in this embodiment of this application, a multi-task learning manner is used to merge an overall image feature of a pedestrian candidate region in the to-be-detected image with a local image feature of each pedestrian part candidate region in the to-be-detected image, so as to diversify features used to determine whether the to-be-detected image includes a pedestrian or a location of a pedestrian in the to-be-detected image, so that different features restrain and promote each other, thereby increasing accuracy of pedestrian detection. In the pedestrian detection method provided in this embodiment of this application, the overall image feature of the pedestrian is merged with the part relationship feature of the pedestrian, so that the method is applicable not only to pedestrian detection in a scenario of a simple pedestrian posture change, but also to pedestrian detection in a scenario of a complex pedestrian posture change. In particular, when a pedestrian posture is changed to a relatively large extent or is relatively seriously blocked, a pedestrian detection rate is higher, and an application scope is wider.

Embodiment 4

Figure 13:
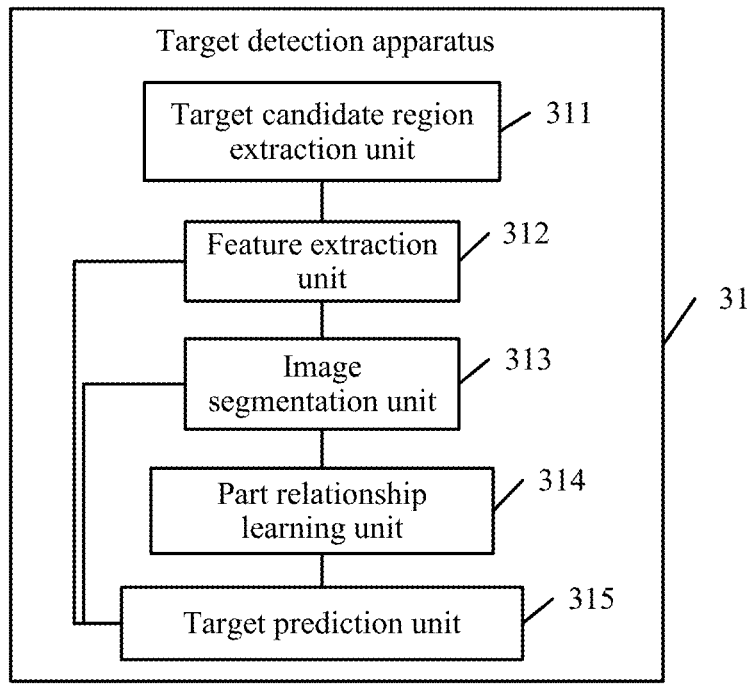
FIG. 13 is another schematic structural diagram of a target detection apparatus according to an embodiment of this application.

FIG. 13 is another schematic structural diagram of a target detection apparatus according to an embodiment of this application. In this embodiment of this application, a target detection apparatus 31 may include a target candidate region extraction unit 311, an image segmentation unit 313, a part relationship learning unit 314, and a target prediction unit 315.

The target candidate region extraction unit 311 is configured to obtain a target candidate region, in a to-be-detected image, for which a target is used as a detected object.

The image segmentation unit 313 is configured to: obtain a positive sample image feature and a negative sample image feature that are used for part identification, and construct a part identification model based on the positive sample image feature and the negative sample image feature.

Optionally, the target detection apparatus 31 may further include a feature extraction unit 312.

The feature extraction unit 312 is configured to obtain a global image feature that is in the to-be-detected image and that corresponds to the target candidate region extracted by the target candidate region extraction unit 311.

The image segmentation unit 313 is further configured to identify, by using the part identification model, at least two part candidate regions from the target candidate region extracted by the target candidate region extraction unit 311, where each part candidate region corresponds to one part of a to-be-detected target; and extract, from the to-be-detected image, local image features corresponding to the part candidate regions.

The part relationship learning unit 314 is configured to learn, by using a bidirectional LSTM, the local image features of the part candidate regions extracted by the image segmentation unit 313, to obtain a part relationship feature used to describe a relationship between the part candidate regions.

The target prediction unit 315 is configured to detect the to-be-detected target in the to-be-detected image based on the part relationship feature obtained by the part relationship learning unit 314.

In some implementations, the image segmentation unit 313 is configured to:
obtain a candidate box template in which a target is used as a detected object, divide the candidate box template into N grids, and determine, from the N grids, a grid covered by a region in which each part of the target is located, where N is an integer greater than 1; and obtain a sample image used for part identification, and determine, from the sample image, a plurality of candidate regions in which the target is used as a detected object; determine a candidate region labeled with the target in the plurality of candidate regions as a positive sample region of the target, and determine a candidate region whose intersection-over-union with the positive sample region is less than a preset proportion as a negative sample region of the target; divide the positive sample region into N grids, and determine, from the N grids of the positive sample region based on the candidate box template, a positive sample grid and a negative sample grid that correspond to each part; divide the negative sample region into N grids, and determine a grid that is in the N grids of the negative sample region and that correspond to each part as a negative sample grid of the part; and determine an image feature of a positive sample grid region of each part as a positive sample image feature of the part, and determine an image feature of a negative sample grid region of each part as a negative sample image feature of the part.

In some implementations, the image segmentation unit 313 is configured to:
determine, from the N grids of the positive sample region based on a grid that is in the candidate box template and that is covered by a region in which each part is located, a part grid covered by each part; and when a part grid covered by any part i includes a part grid j, and a degree at which a region covered by the part i in the part grid j overlaps a region of the part grid j is greater than or equal to a preset threshold, determine the part grid j as a positive sample grid of the part i, to determine a positive sample grid of each part, where both i and j are natural numbers; or when a part grid covered by any part i includes a part grid j, and a degree at which a region covered by the part i in the part grid j overlaps a region of the part grid j is less than a preset threshold, determine the part grid j as a negative sample grid of the part i, to determine a negative sample grid of each part.

In some implementations, the image segmentation unit 313 is configured to:
use the positive sample image feature of each part and the negative sample image feature of each part as input of the part identification model, and learn, by using the part identification model and by using a binary classification problem distinguishing between a target part and a background as a learning task, a capability of obtaining a local image feature of the part.

In some implementations, the target prediction unit 315 is configured to:
merge the part relationship feature obtained by the part relationship learning unit 314 with the global image feature obtained by the feature extraction unit 312; obtain, through learning, a first confidence level of each of a category and a location of the to-be-detected target in the to-be-detected image based on a merged feature; determine, based on the global image feature, a second confidence level at which the target candidate region includes the to-be-detected target, and determine, based on merging of the first confidence level and the second confidence level, that the to-be-detected image includes the to-be-detected target; and determine a location of the to-be-detected target in the to-be-detected image based on a location, in the to-be-detected image, of the target candidate region including the to-be-detected target.

In some implementations, the part relationship learning unit 314 is configured to:
sort, in a preset part sequence, the local image features of the part candidate regions obtained by the image segmentation unit 313 to obtain a sorted feature sequence, and input the sorted feature sequence to the bidirectional LSTM; and learn, by using the bidirectional LSTM, the relationship between the part candidate regions by using a binary classification problem distinguishing between a target and a background as a learning task.

In some implementations, the relationship between the part candidate regions includes at least one of a relationship between the detected target and the part candidate regions, or a dependency relationship between the part candidate regions. The relationship between the detected target and the part candidate regions includes: a relationship that is between a same detected target to which the part candidate regions belong and the part candidate regions and that exists when the part candidate regions belong to the same detected target, and/or a relationship that is between each of the part candidate regions and a detected target to which the part candidate region belongs and that exists when the part candidate regions belong to different detected targets.

In specific implementation, the target detection apparatus 31 may perform the implementations provided in steps in Embodiment 2 by using the built-in units of the target detection apparatus 31. For details, refer to the implementation performed by a corresponding unit in Embodiment 2. Details are not described herein again.

In this embodiment of this application, in an earlier data preparation phase, the target detection apparatus 31 provided in Embodiment 4 does not need to separately label parts of a pedestrian, and neither a pixel-level label nor a rectangular box label is required. Therefore, workload caused by data obtaining in an earlier training phase can be reduced, thereby greatly reducing a time consumed for earlier data preparation. This is simpler to operate, and implementation complexity of pedestrian detection is reduced. An implementation different from that used by the target detection apparatus 21 in Embodiment 3 is used in Embodiment 4 to identify a pedestrian part, so as to diversify manners of identifying the pedestrian part, and diversify implementations of pedestrian detection in the to-be-detected image.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A method, comprising:
    obtaining a target candidate region in a to-be-detected image;
    determining at least two part candidate regions from the target candidate region by using an image segmentation network, wherein each part candidate region corresponds to one part of a to-be-detected target; and extracting, from the to-be-detected image, local image features corresponding to the part candidate regions;
    learning the local image features of the part candidate regions by using a bidirectional long short-term memory (LSTM) network, to obtain a part relationship feature used to describe a relationship between the part candidate regions; and
    detecting the to-be-detected target in the to-be-detected image based on the part relationship feature.

2. The method according to claim 1, wherein the detecting the to-be-detected target in the to-be-detected image based on the part relationship feature comprises:
    determining the to-be-detected target in the to-be-detected image based on the part relationship feature with reference to a global image feature, wherein the global image feature corresponds to the target candidate region; and
    the detecting the to-be-detected target in the to-be-detected image based on the part relationship feature further comprises:
    obtaining the global image feature corresponding to the target candidate region.

3. The method according to claim 2, wherein the detecting the to-be-detected target in the to-be-detected image based on the part relationship feature with reference to a global image feature comprises:
    merging the part relationship feature with the global image feature, and obtaining, through learning, a first confidence level of each of a category and a location of the to-be-detected target in the to-be-detected image based on a merged feature;
    determining, based on the global image feature, a second confidence level at which the target candidate region comprises the to-be-detected target; and determining, based on merging of the first confidence level and the second confidence level, that the to-be-detected image comprises the to-be-detected target; and
    determining a location of the to-be-detected target in the to-be-detected image based on a location of the target candidate region in the to-be-detected image.

4. The method according to claim 1, wherein the learning the local image features of the part candidate regions by using the LSTM network comprises:
    sorting the local image features of the part candidate regions in a preset sequence to obtain a sorted feature sequence, and inputting the feature sequence to the LSTM network; and
    learning, by using the LSTM network, the relationship between the part candidate regions by using a binary classification problem distinguishing between a target and a background as a learning task.

5. The method according to claim 4, wherein the relationship between the part candidate regions comprises at least one of a relationship between the to-be-detected target and the part candidate regions, or a dependency relationship between the part candidate regions.

6. A method, comprising:
    obtaining a target candidate region in a to-be-detected image;
    obtaining a positive sample image feature and a negative sample image feature that are used for part identification, and constructing a part identification model based on the positive sample image feature and the negative sample image feature;
    identifying at least two part candidate regions from the target candidate region by using the part identification model, wherein each part candidate region corresponds to one part of a to-be-detected target; and extracting, from the to-be-detected image, local image features corresponding to the part candidate regions;
    learning the local image features of the part candidate regions by using a bidirectional long short-term memory (LSTM) network, to obtain a part relationship feature used to describe a relationship between the part candidate regions; and
    detecting the to-be-detected target in the to-be-detected image based on the part relationship feature.

7. The method according to claim 6, wherein the obtaining the positive sample image feature and the negative sample image feature that are used for part identification comprises:
    obtaining a candidate box template, dividing the candidate box template into N grids, and determining, from the N grids, a grid covered by a region in which each part of the target is located, wherein N is an integer greater than 1;
    obtaining a sample image used for part identification, and determining a plurality of candidate regions from the sample image;
    determining a candidate region labeled with the target in the plurality of candidate regions as a positive sample region of the target, and determining a candidate region whose intersection-over-union with the positive sample region is less than a preset proportion as a negative sample region of the target;
    dividing the positive sample region into N grids, and determining, from the N grids of the positive sample region based on the candidate box template, a positive sample grid and a negative sample grid that correspond to each part;
    dividing the negative sample region into N grids, and determining a grid that is in the N grids of the negative sample region and that corresponds to a respective part as a negative sample grid of the part; and
    determining an image feature of a positive sample grid region of each part as a positive sample image feature of the part, and determining an image feature of a negative sample grid region of each part as a negative sample image feature of the part.

8. The method according to claim 7, wherein the determining, from the N grids of the positive sample region based on the candidate box template, the positive sample grid and the negative sample grid that correspond to each part comprises:

determining, from the N grids of the positive sample region based on a grid that is in the candidate box template and that is covered by a region in which each part is located, one or more part grids covered by the part; and when one or more part grids covered by any part i comprises a part grid j, and a degree at which a region covered by the part i in the part grid j overlaps a region of the part grid j is greater than or equal to a preset threshold, determining the part grid j as a positive sample grid of the part i, to determine a positive sample grid of each part, wherein both i and j are natural numbers.

9. The method according to claim 7, wherein the determining, from the N grids of the positive sample region based on the candidate box template, the positive sample grid and the negative sample grid that correspond to each part comprises:

determining, from the N grids of the positive sample region based on a grid that is in the candidate box template and that is covered by a region in which each part is located, one or more part grids covered by the part; and when one or more part grids covered by any part i comprises a part grid j, and a degree at which a region covered by the part i in the part grid j overlaps a region of the part grid j is less than a preset threshold, determining the part grid j as a negative sample grid of the part i, to determine a negative sample grid of each part, wherein both i and j are natural numbers.

10. The method according to claim 6, wherein the constructing the part identification model based on the positive sample image feature and the negative sample image feature comprises:

using the positive sample image feature of each part and the negative sample image feature of each part as input of the part identification model, and learning, by using the part identification model and by using a binary classification problem distinguishing between a target part and a background as a learning task, a capability of obtaining a local image feature of the part.

11. The method according to claim 10, wherein the detecting the to-be-detected target in the to-be-detected image based on the part relationship feature comprises:

merging the part relationship feature with a global image feature, and obtaining, through learning, a first confidence level of each of a category and a location of the to-be-detected target in the to-be-detected image based on a merged feature, wherein the global image feature corresponds to the target candidate region;

determining, based on the global image feature, a second confidence level at which the target candidate region comprises the to-be-detected target; and determining, based on merging of the first confidence level and the second confidence level, that the to-be-detected image comprises the to-be-detected target; and determining a location of the to-be-detected target in the to-be-detected image based on a location, in the to-be-detected image, of the target candidate region comprising the to-be-detected target; and the detecting the to-be-detected target in the to-be-detected image based on the part relationship feature further comprises:

obtaining the global image feature corresponding to the target candidate region.

12. The method according to claim 11, wherein the learning the local image features of the part candidate regions by using the LSTM network comprises:

sorting the local image features of the part candidate regions in a preset sequence to obtain a sorted feature sequence, and inputting the feature sequence to the LSTM network; and learning, by using the bidirectional long short-term memory (LSTM) network, the relationship between the part candidate regions by using a binary classification problem distinguishing between a target and a background as a learning task.

13. The method according to claim 12, wherein the relationship between the part candidate regions comprises at least one of a relationship between the to-be-detected target and the part candidate regions, or a dependency relationship between the part candidate regions.

14. A computer device, wherein the computer device comprises:

a processor; and a memory, wherein the memory is configured to store a program instruction, and when the processor invokes the program instruction, the program instruction enables the processor to perform a method according to the following steps:

obtaining a target candidate region in a to-be-detected image;

determining at least two part candidate regions from the target candidate region by using an image segmentation network, wherein each part candidate region corresponds to one part of a to-be-detected target; and extracting, from the to-be-detected image, local image features corresponding to the part candidate regions;

learning the local image features of the part candidate regions by using a bidirectional long short-term memory (LSTM) network, to obtain a part relationship feature used to describe a relationship between the part candidate regions; and detecting the to-be-detected target in the to-be-detected image based on the part relationship feature.

* * * * *

UNITED STATES PATENT AND TRADEMARK OFFICE
CERTIFICATE OF CORRECTION

PATENT NO. : 11,367,272 B2
APPLICATION NO. : 16/854815
DATED : June 21, 2022
INVENTOR(S) : Yi Yang et al.

It is certified that error appears in the above-identified patent and that said Letters Patent is hereby corrected as shown below:

In the Specification

Column 20, Line 45, formula (3):
$o_t \times \sigma(W_o x_t + U_o h_{t-1})$ (3)

Should be:
$o_t = \sigma(W_o x_t + U_o h_{t-1})$ (3)

Signed and Sealed this
Fourth Day of October, 2022

Katherine Kelly Vidal
*Director of the United States Patent and Trademark Office*